(12) United States Patent
Han et al.

(10) Patent No.: US 11,343,173 B2
(45) Date of Patent: May 24, 2022

(54) SYSTEMS AND METHODS TO IMPLEMENT PATH AWARE NETWORKING

(71) Applicant: HUAWEI TECHNOLOGIES CO., LTD., Shenzhen (CN)

(72) Inventors: Lin Han, San Jose, CA (US); Yingzhen Qu, San Jose, CA (US); Lijun Dong, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/130,811

(22) Filed: Dec. 22, 2020

(65) Prior Publication Data

US 2021/0152465 A1 May 20, 2021

Related U.S. Application Data

(63) Continuation of application No. PCT/US2019/035639, filed on Jun. 5, 2019.
(Continued)

(51) Int. Cl.
*H04L 45/24* (2022.01)
*H04L 45/02* (2022.01)
(Continued)

(52) U.S. Cl.
CPC .............. *H04L 45/24* (2013.01); *H04L 45/02* (2013.01); *H04L 45/125* (2013.01); *H04L 45/42* (2013.01); *H04L 45/50* (2013.01); *H04L 45/52* (2013.01)

(58) Field of Classification Search
CPC ....... H04L 45/24; H04L 45/02; H04L 45/125; H04L 45/42; H04L 45/50; H04L 45/52; H04L 45/121; H04L 47/805
See application file for complete search history.

(56) References Cited

U.S. PATENT DOCUMENTS

| 9,929,949 B2 * | 3/2018 | Mahadevan ............ H04L 45/42 |
| 2016/0173410 A1 * | 6/2016 | Lopez .................... H04L 67/306 370/230 |

(Continued)

FOREIGN PATENT DOCUMENTS

| WO | 2016141884 A1 | 9/2016 |
| WO | 20177215385 A1 | 12/2017 |
| WO | 2018033769 A1 | 2/2018 |

OTHER PUBLICATIONS

Cullen, M., et al., "BANANA BOF Scope & Problem Description," IETF97, Seoul, Korea, Nov. 17, 2016, 16 pages.
(Continued)

*Primary Examiner* — Mohamed A Kamara
(74) *Attorney, Agent, or Firm* — Conley Rose, P.C.

(57) ABSTRACT

A method implemented by an end user device in a network, comprises transmitting user service expectation data to a network element (NE) in the network, the user service expectation data describing an expected network attribute of a path between the end user device and a destination, receiving path aware network data from the NE in response to transmitting the user service expectation data describing the expected network attribute to the NE, the path aware network data comprising a path index, path quality information, and data plane information, the path index identifying the path, the path quality information describing a network attribute supported by the NE on the path, and the data plane information comprising information associated with a protocol by which to transmit a data packet along the path, and transmitting the data packet along the path based on the data plane information.

28 Claims, 20 Drawing Sheets

Related U.S. Application Data

(60) Provisional application No. 62/699,028, filed on Jul. 17, 2018.

(51) Int. Cl.
*H04L 45/50* (2022.01)
*H04L 45/125* (2022.01)
*H04L 45/42* (2022.01)
*H04L 45/52* (2022.01)

(56) References Cited

U.S. PATENT DOCUMENTS

2018/0343191 A1* 11/2018 Hao .................. H04L 45/20
2019/0036808 A1* 1/2019 Shenoy ............... H04L 45/64

OTHER PUBLICATIONS

"Hybrid Access Broadband Network Architecture" Broadband forum, Technical Report, Issue 1, Jul. 2016, 49 pages.
Droms, R., Ed., et al., "Dynamic Host Configuration Protocol for IPv6 (DHCPv6)," RFC 3315, Jul. 2003, 101 pages.
Narten, T., et al., "Neighbor Discovery for IP version 6 (IPv6)," RFC 4861, Sep. 2007, 97 pages.
Ford, A., et al., "TCE Extensions for Multipath Operation with Multiple Addresses," RFC 6824, Janaury 2013, 64 pages.
Leymann, N., "Huawei's GRE Tunnel Bonding Protcol," RFC 8157, May 2017, 44 pages.
Deering, S., et al., "Internet Protocol, Version 6 (IPv6) Specification," RFC 8200, Jul. 2017, 42 pages.

* cited by examiner

SYSTEMS AND METHODS TO IMPLEMENT PATH AWARE NETWORKING

CROSS-REFERENCE TO RELATED APPLICATIONS

The present application is a continuation of International Patent Application PCT/US2019/035639 filed Jun. 5, 2019 by Futurewei Technologies, Inc. and claims the benefit of U.S. Provisional Patent Application No. 62/699,028 filed Jul. 17, 2018 by Lin Han, et al., and entitled "Method to Support The Path-Aware Networking For Internet That is Not Path Aware," all of which are incorporated herein by reference as if reproduced in their entireties.

FIELD OF INVENTION

The present disclosure pertains to the field of path aware networking. In particular, the present disclosure relates to the communication of information describing multiple paths between an end user device and a content provider network to the end user device, such that data traffic can be forwarded along a selected path.

BACKGROUND

The current Internet provides an Internet Protocol (IP)-based best effort transmission method in which traffic is forwarded through the network without necessarily guaranteeing that the traffic will reach the intended destination. For example, packets may be dropped or discarded by routers in the network. For this reason, end user devices in the network have little information about paths to other endpoints in the network.

In addition, some of the networks implementing the IP-based best effort transmission method may also implement Multipath Transmission Control Protocol (MPTCP). MPTCP is an effort towards allowing a Transmission Control Protocol (TCP) connection to use multiple paths to maximize resource usage and increase redundancy. The redundancy offered by MPTP increases the throughput to the sum of all available link-level channels in the network, instead of using a single available link-level channel as prescribed by standard TCP.

SUMMARY

According to a first aspect of the present disclosure, there is provided a method implemented by an end user device in a network. The method comprises transmitting, by the end user device, user service expectation data to a network element (NE) in the network, the user service expectation data describing an expected network attribute of a path between the end user device and a destination, receiving, by the end user device, path aware network data from the NE in response to transmitting the user service expectation data describing the expected network attribute to the NE, the path aware network data comprising a path index, path quality information, and data plane information, the path index identifying the path, the path quality information describing a network attribute supported by the NE on the path, and the data plane information comprising information associated with a protocol by which to transmit a data packet along the path, and transmitting, by the end user device, the data packet along the path based on the data plane information.

In a first implementation of the method according to the first aspect, the expected network attribute comprises at least one of a minimum bandwidth available on the path, a maximum bandwidth permitted to be forwarded along the path, a maximum latency for user data on the path, or a burst size permitted to be forwarded along the path.

In a second implementation of the method according to the first aspect or any preceding implementation of the first aspect, the user service expectation data indicates whether the end user device requests a higher bandwidth, a shorter latency for the path, a cost preference associated with different bandwidths and latencies, or a reliability of the path.

In a third implementation of the method according to the first aspect or any preceding implementation of the first aspect, the path quality information comprises at least one of a minimum bandwidth permitted to be forwarded along the NE, a maximum bandwidth permitted to be forwarded along the NE, a maximum latency for user data along the path, or a maximum burst size permitted to be forwarded along the NE.

In a fourth implementation of the method according to the first aspect or any preceding implementation of the first aspect, the path quality information comprises a cost associated with one or more paths.

In a fifth implementation of the method according to the first aspect or any preceding implementation of the first aspect, the protocol by which to transmit the data packet along the path is a path aware routing protocol, wherein the data plane information comprise a proxy address associated with a proxy along the path.

In a sixth implementation of the method according to the first aspect or any preceding implementation of the first aspect, the protocol by which to transmit the data packet along the path is Segment Routing over Internet Protocol version 6 data plane (SRv6), wherein the data plane information comprises a segment list, and wherein the segment list comprises an address for each segment on the path.

In a seventh implementation of the method according to the first aspect or any preceding implementation of the first aspect, the protocol by which to transmit the data packet along the path is Multiprotocol Label Switching (MPLS), wherein the data plane information comprises an outmost MPLS label and an inner MPLS label of an MPLS label stack.

In a eighth implementation of the method according to the first aspect or any preceding implementation of the first aspect, a protocol by which to transmit the data packet along the path is a path aware routing protocol, wherein the data plane information comprises a proxy address of a proxy on the path, wherein transmitting the data packet along the path based on the data plane information comprises encapsulating the data packet to include a routing extension header, wherein the routing extension header includes a new routing type indicating the path aware routing, the proxy address, and the path index.

In a ninth implementation of the method according to the first aspect or any preceding implementation of the first aspect, the data packet is transmitted to a proxy corresponding to the proxy address.

In a tenth implementation of the method according to the first aspect or any preceding implementation of the first aspect, the user service expectation data is carried in a new options field of a router solicitation message of Internet Protocol (IPv6) Neighbor Discovery Protocol, or a new options field of a Dynamic Host Configuration Protocol version 6 (DHCPv6) SOLICIT message, or an options field of a DHCPv6 REQUEST message.

In a eleventh implementation of the method according to the first aspect or any preceding implementation of the first aspect, the path aware network data is carried in an new options field of a router advertisement message of Internet Protocol (IPv6) Neighbor Discovery Protocol, a new options field of a Dynamic Host Configuration Protocol version 6 (DHCPv6) ADVERTISE message, or an options field of a DHCPv6 REPLY message.

According to a second aspect of the present disclosure, there is provided another method implemented by an NE in a network. The method comprises receiving, by the NE, user service expectation data from an end user device in the network, the user service expectation data describing an expected network attribute of a path between the end user device and a destination, transmitting, by the NE, path aware network data to the end user device, the path aware network data comprising a path index, path quality information, and data plane information, the path index identifying the path in response to receiving the user service expectation data from the end user device, the path quality information describing a network attribute supported by the NE on the path, and the data plane information comprising information associated with a protocol by which to transmit a data packet along the path, and transmitting, by the end user device, the data packet along the path based on the data plane information.

In a first implementation of the method according to the second aspect, the expected network attribute comprises at least one of a minimum bandwidth available on the path, a maximum bandwidth permitted to be forwarded along the path, a maximum latency for user data on the path, or a burst size permitted to be forwarded along the path.

In a second implementation of the method according to the second aspect or any preceding implementation of the second aspect, the user service expectation data indicates whether the end user device requests a higher bandwidth, a shorter latency for each of the plurality of paths, a cost preference associated with different bandwidths and latencies, or a reliability of the path.

In a third implementation of the method according to the second aspect or any preceding implementation of the second aspect, the user service expectation data is carried in a new options field of a router solicitation message of Internet Protocol (IPv6) Neighbor Discovery Protocol, or a new options field of a Dynamic Host Configuration Protocol version 6 (DHCPv6) SOLICIT message, or an options field of a DHCPv6 REQUEST message.

In a fourth implementation of the method according to the second aspect or any preceding implementation of the second aspect, the path quality information comprises at least one of a minimum bandwidth permitted to be forwarded along the NE, a maximum bandwidth permitted to be transmitted along the NE, a maximum latency for user data long the path, a maximum burst size permitted to be forwarded along the NE, or a cost associated with one or more paths.

In a fifth implementation of the method according to the second aspect or any preceding implementation of the second aspect, the protocol by which to transmit the data packet along the path is a path aware routing protocol, wherein the data plane information comprises a proxy address associated with a proxy along the path.

In a sixth implementation of the method according to the second aspect or any preceding implementation of the second aspect, the protocol by which to transmit the data packet along the path is Segment Routing over Internet Protocol version 6 data plane (SRv6), wherein the data plane information comprises a segment list, and wherein the segment list comprises an address for each segment on the path.

In a seventh implementation of the method according to the second aspect or any preceding implementation of the second aspect, the protocol by which to transmit the data packet along the path is Multiprotocol Label Switching (MPLS), wherein the data plane information comprises an outmost MPLS label and an inner MPLS label.

In an eighth implementation of the method according to the second aspect or any preceding implementation of the second aspect, the path aware network data is carried in a new options field of a router advertisement message of Internet Protocol (IPv6) Neighbor Discovery Protocol, a new options field of a Dynamic Host Configuration Protocol version 6 (DHCPv6) ADVERTISE message, or an options field of a DHCPv6 REPLY message.

In a ninth implementation of the method according to the second aspect or any preceding implementation of the second aspect, a protocol by which to transmit the data packet along the path is a path aware routing protocol, and wherein the method further comprises receiving, by the NE, the data packet comprising a routing extension header, wherein the routing extension header includes a routing type and the path index, and wherein transmitting the data packet along the path based on the data plane information comprises decapsulating the data packet to remove the routing extension header, determining a next hop for the data packet based on the path index, and forwarding the data packet to the next.

In a tenth implementation of the method according to the second aspect or any preceding implementation of the second aspect, the protocol by which to transmit the data packet along the path is path aware Internet Protocol version 6 (IPv6), wherein the data plane information comprises a proxy address associated with a proxy along the path, and wherein the NE is a proxy corresponding to the proxy address.

According to a third aspect of the present disclosure, there is provided an end user device comprising a memory configured to store instructions, and a processor coupled to the memory and configured to execute the instructions to cause the processor to be configured to transmit user service expectation data to a network element (NE) in the network, the user service expectation data describing an expected network attribute of a path between the end user device and a destination, receive path aware network data from the NE in response to transmitting the user service expectation data to the NE, the path aware network data comprising a path index, path quality information, and data plane information, the path index identifying the path, the path quality information describing a network attribute supported by the NE on the path, and the data plane information comprising information associated with a protocol by which to transmit a data packet along the path, and transmit the data packet along the path based on the data plane information.

According to a fourth aspect of the present disclosure, there is provided a network element, comprising a memory configured to store instructions, a processor coupled to the memory and configured to execute the instructions to cause the processor to be configured to receive user service expectation data from an end user device in the network, the user service expectation data describing an expected network attribute of a path between the end user device and a destination, transmit path aware network data to the end user device, the path aware network data comprising a path index, path quality information, and data plane information in response to receiving the user service expectation data from the end user device, the path index identifying the path, the path quality information describing a network attribute supported by the NE on the path, and the data plane information comprising information associated with a protocol by which to transmit a data packet along the path, and transmit the data packet along the path based on the data plane information.

According to a fifth aspect of the present disclosure, there is provided an apparatus, comprising a means for transmitting user service expectation data to a network element (NE) in the network, the user service expectation data describing an expected network attribute of a path between the end user device and a destination, a means for receiving path aware network data from the NE in response to transmitting the user service expectation data to the NE, the path aware network data comprising a path index, path quality information, and data plane information, the path index identifying the path, the path quality information describing a network attribute supported by the NE on the path, and the data plane information comprising information associated with a protocol by which to transmit a data packet along the path, and a means for transmitting the data packet along the path based on the data plane information.

According to a sixth aspect of the present disclosure, there is provided an apparatus, comprising a means for receiving user service expectation data from an end user device in the network, the user service expectation data describing an expected network attribute of a path between the end user device and a destination, a means for transmitting path aware network data to the end user device, the path aware network data comprising a path index, path quality information, and data plane information in response to receiving the user service expectation data from the end user device, the path index identifying the path, the path quality information describing a network attribute supported by the NE on the path, and the data plane information comprising information associated with a protocol by which to transmit a data packet along the path, and a means for transmitting the data packet along the path based on the data plane information.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1A:
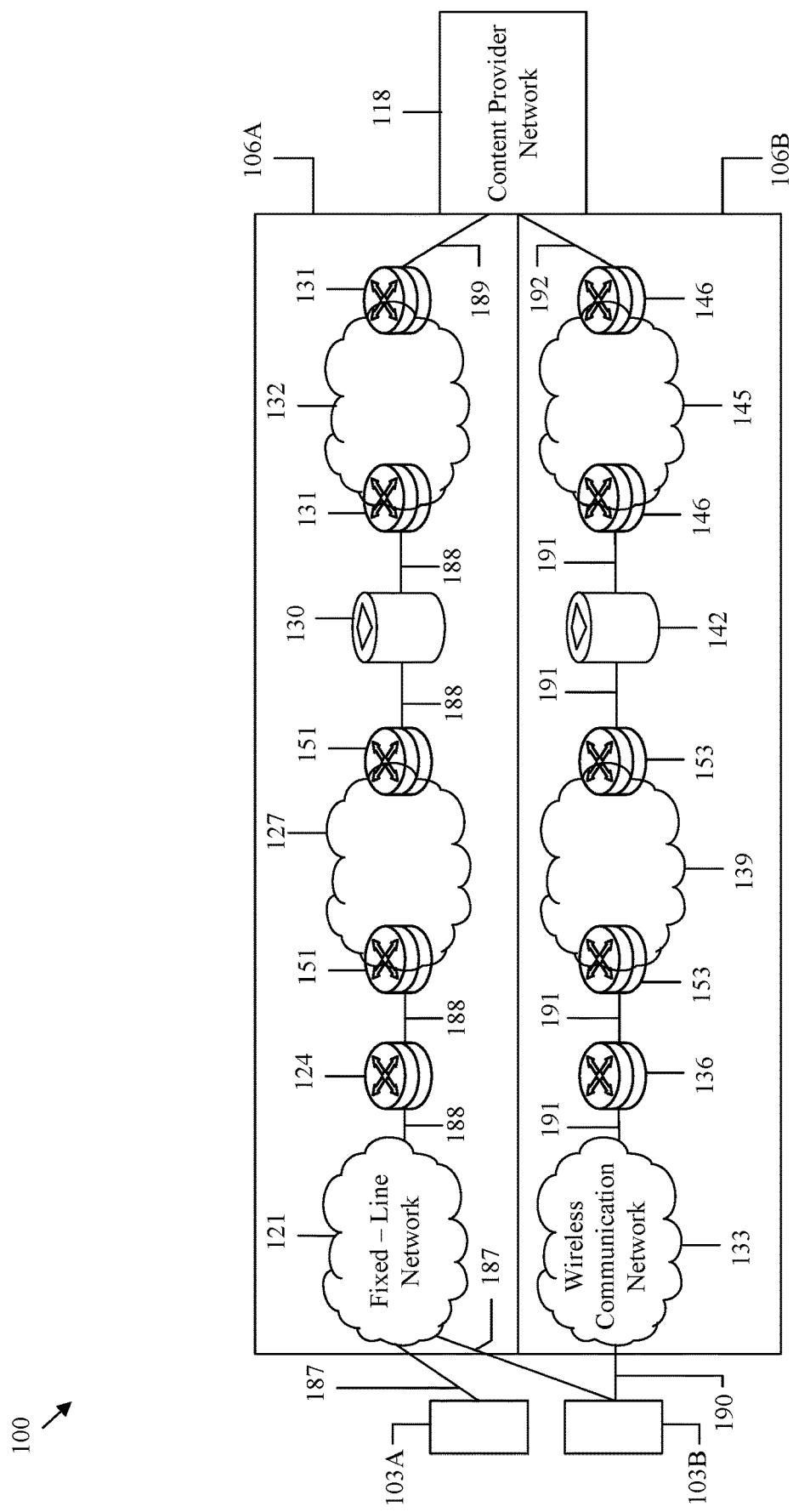
FIG. 1A is a diagram illustrating a network configured to implement path aware networking according to various embodiments of the disclosure.

FIG. 1A is a diagram illustrating a network 100 configured to implement path aware networking according to various embodiments of the disclosure. The network 100 may be a packet-switched network in which a transmission protocol, such as IP version 6 (IPv6), Segment Routing over Internet Protocol version 6 (IPv6) data plane (SRv6), or Multiprotocol Label Switching (MPLS) is implemented. In an embodiment, network 100 represents a generalized and logical architecture of the Internet connecting an end user device 103A-B to a content provider network 118.

As shown by FIG. 1A, network 100 includes two end user devices 103A-B connected to a content provider network 118 via two subnetworks 106A-B. Specifically, end user device 103A is connected to the content provider network 118 via subnetwork 106A and end user device 103B is connected to the content provider network 118 via both subnetwork 106A and 106B.

Subnetwork 106A includes a fixed-line network 121, an access router 124, a metro network 127, a broadband network gateway (BNG) 130, and an IP core network 132 interconnected by links 188. The end user device 103A is connected to a network element (NE) within the fixed-line network 121 via a link 187. Similarly, the end user device 103B is connected to a NE within the fixed-line network 121 via a link 187. An NE 131 within the IP core network 132 is connected to the content provider network 118 via link 189.

The end user devices 103A-B may refer to one or more of a variety of devices utilized by a user, which may request content from the content provider network 118. For example, the end user device 103A-B may be a mobile phone, a mobile tablet, a wearable device, a personal computer, a laptop, a stationary device, a mobile machine type device, or any other type of user equipment.

The fixed-line network 121 is a wired network used for voice and data communications. The fixed-line network 121 is an access network connected to the end user devices 103A-B by means of a cable through which a user can make phone calls or connect to the Internet. For example, the fixed-line network 121 may be a Digital Subscriber Line (DSL) network, a Passive Optical Network (PON), or a Fiber-to-the-Home (FTTP) network including optical network units (ONUs) and an optical line terminal (OLT). In an embodiment, the fixed-line network 121 may also provide Wireless Fidelity (WiFi) Internet access to the end user devices 103A-B.

The access router 124 interconnects the fixed-line network 121 and the metro network 127. In an embodiment, the access router 124 is a router, switch, bridge, gateway, or virtual machine (VM) that encapsulates or decapsulates data packets before transmitting data packets to the metro network 127.

The metro network 127 (also referred to as a metropolitan-area Ethernet) is a metropolitan area network that is based on Ethernet standards. The metro network 127 connects the end user devices 103A-B to a larger service network. As shown by FIG. 1A, the metro network 127 includes one or more NEs 151. Each of the NEs 151 is a router, switch, bridge, gateway, or VM that is configured to encapsulate, forward, and decapsulate packets according to one of the transmission protocols implemented by the network 100. The NEs 151 within the metro network 127 are interconnected by wired links, wireless links, and/or interfaces. In an embodiment, the access router 124 may be coupled to a first NE 151 within the metro network 127 via the link 188, and a second NE 151 within the metro network 127 may be coupled to the BNG 130 via the link 188.

The BNG 130 is broadband gateway, or network device, that is used to connect end user devices 103A-B to the Internet or another wide area network (WAN). In some cases, different service providers have different BNGs 130, and each BNG 130 connects to NEs 151 in the metro network 127 that also belongs to the same service provider. In this way, it should be appreciated that network 100 may include multiple BNGs 130, even though only one BNG 130 is shown in FIG. 1A.

The BNG 130 may be responsible for operations and administration related data gathering and computations. For example, the BNG 130 for a particular service provider may perform billing and authentication of one or more end user devices 103A-B. As shown by FIG. 1A, the BNG 130 is connected to an NE 131 of the IP core network 132.

The IP core network 132 is a central part of the network 100 that may provide various services to customers (e.g., end user devices 103A-B) connected by the fixed-line network 121. The IP core network 132 includes multiple NEs 131, each of which is a router, switch, bridge, gateway, or VM. Each NE 131 is configured to encapsulate, forward, and decapsulate packets according to one of the transmission protocols implemented by the network 100. The IP core network 132 may also include high capacity communications facilities and subnetworks configured to transport packets and content within the IP core network 132. The NEs 131 shown in FIG. 1A may be provider edge (PE) NEs 131 that are positioned on the edge of the IP core network 132 to form an interface between the IP core network 132, the BNG 130, and the content provider network 118. For example, one of the PE NEs 131 connects to an NE of the content provider network 118.

The content provider network 118 refers a network of proxy servers and data centers configured to store and maintain content that may be transmitted to end user devices 103A-B. The content stored and maintained at the content provider network 118 includes web objects (text, graphics, and scripts), downloadable objects (media files, software, and documents), applications (e-commerce, portals), live streaming media, on-demand streaming media, and social media sites.

While the content provider network 118 is shown as a single box, the content provider network 118 may actually be a geographically distributed network of proxy service and data centers. The content provider network 118 is configured to provide high availability and high performance by distributing services spatially relative to end user devices 103A-B.

The links 187, 188, and 189 may be wired links, wireless links, and/or interfaces used to communicate data within the subnetwork 106A. Although FIG. 1A only shows the fixed-line network 121, access router 124, metro network 127, BNG 130, and IP core network 132 positioned between the end user devices 103A-B and the content provider network 118, it should be appreciated that other network devices, subnetworks, or entities may also be positioned anywhere in between the end user devices 103A-B and the content provider network 118. It should also be appreciated that multiple NEs may be positioned throughout the subnetwork 106A, even though they are not explicitly shown in FIG. 1A.

Subnetwork 106B includes a wireless communication network 133, an aggregation router 136, a metro network 139, a packet gateway (PGW) 142, and an IP core network 145 interconnected by links 191. The end user device 103B is connected to a NE within the wireless communication network 133 via a link 190. A NE 146 within the IP core network 132 is connected to the content provider network 118 via link 192.

The wireless communication network 133 is a wireless network or an evolved packet core (EPC) network used for voice and data communication. The wireless communication network 133 is an access network connected to the end user devices 103A-B through wireless transmission technologies. For example, the wireless communication network 133 may include an Evolved Node B connected to a cell site gateway (CSG). In an embodiment, the wireless communication network 133 may be configured to provide Long Term Evolution (LTE), $4^{th}$ generation (4G), or $5^{th}$ generation (5G) wireless broadband communications to the end user devices 103A-B.

The wireless communication network 133 may include an aggregation router 136, which may be a router, switch, gateway, bridge, or VM that is configured to encapsulate, forward, and decapsulate packets according to one of the transmission protocols implemented by the network 100. In an embodiment, the aggregation router 136 is used by standards such as LTE, 4G, and 5G to encapsulate packets received from the end user devices 103A-B into IP packets.

The metro network 139 is similar to the metro network 127, except that the metro network 139 communicates with NEs within the wireless communication network 133. The metro network 139 includes NEs 153, which may each be a router, switch, bridge, gateway, or VM that is configured to encapsulate, forward, and decapsulate packets according to one of the transmission protocols implemented by the network 100. The NEs 153 within the metro network 139 are interconnected by wired links, wireless links, and/or interfaces. In an embodiment, the aggregation router 136 may be coupled to a first NE 153 within the metro network 139 via the link 191, and a second NE 153 within the metro network 139 may be coupled to the PGW 142 via the link 191.

The PGW 142 operates similar to the BNG 130, except that the PGW 142 is configured to operate with the wireless communication network 133. The PGW 142 is connected to the IP core network 145, which is similar to the IP core network 132 of the subnetwork 106A. The IP core network 145 includes multiple NEs 146, each of which is configured to encapsulate, forward, and decapsulate packets according to one of the transmission protocols implemented by the network 100. The NEs 146 shown in FIG. 1A are PE NEs 146 that are positioned on the edge of the IP core network 145. A first NE 146 is connected to the PGW 142 via the link 191, and a second NE 146 is connected to the content provider network 118 via link 192.

The links 190, 191, and 192 may be wired links, wireless links, and/or interfaces used to communicate data within the subnetwork 106B. Although FIG. 1A only shows the wireless communication network 133, aggregation router 136, metro network 139, PGW 142, and IP core network 145 positioned between the end user devices 103A-B and the content provider network 118, it should be appreciated that other network devices, subnetworks, or entities may also be positioned anywhere in between the end user devices 103A-B and the content provider network 118. It should also be appreciated that multiple NEs may be positioned throughout the subnetwork 106B, even though they are not explicitly shown in FIG. 1A.

In operation, the end user device 103A-B sends a request for content or data through a path along a subnetwork 106A-B to the content provider network 118. The content provider network 118 provides the content back the end user device 103A-B via the path.

In an embodiment, the network 100 may implement Multipath Transmission Control Protocol (MPTCP), in which multiple paths may be provisioned between the end user device 103A-B and the content provider network 118 through one or more of the subnetworks 106A-B. MPTCP allows a TCP connection to use multiple paths to maximize resource usage and increase redundancy. The total bandwidth of the multiple paths provisioned between the end user device 103A-B and the content provider network 118 is a sum of the bandwidths on each path of the multiple paths. For example, suppose that there are four paths between the end user device 103A-B and the content provider network 118, and each of the paths have a bandwidth of 25 Megabits per second (Mbps). In this case, the total bandwidth for the multiple paths provisioned between the end user device 103A-B and the content provider network 118 is 100 Mbps. In this way, MPTCP increases the TCP throughput to the sum of all available link-level channels in the network 100 between the end user device 103A-B and the content provider network 118.

However, MPTCP can only be implemented by an end user device 103A-B when an end user device 103A-B is connected to both the fixed-line network 121 and the wireless communication network 133. For example, the end user device 103B may communicate data over network 100 using MPTCP because the end user device 103B is connected to both fixed-line network 121 and the wireless communication network 133. However, the end user device 103A may not be permitted to communicate data over network 100 using MPTCP.

In addition, multiple separate and disjoint paths may not be available throughout the entire network 100. For example, within subnetwork 106A, multiple paths may only be available within one of the fixed-line network 121, metro network 127, or the IP core network 132. Similarly, within subnetwork 106B, multiple paths may only be available within one of the wireless communications network 133, metro network 139, and the IP core network 145. An example of a network 100 in which multiple paths are only available with a particular section of the network 100 is shown and described below with reference to FIG. 1B.

Figure 1B:
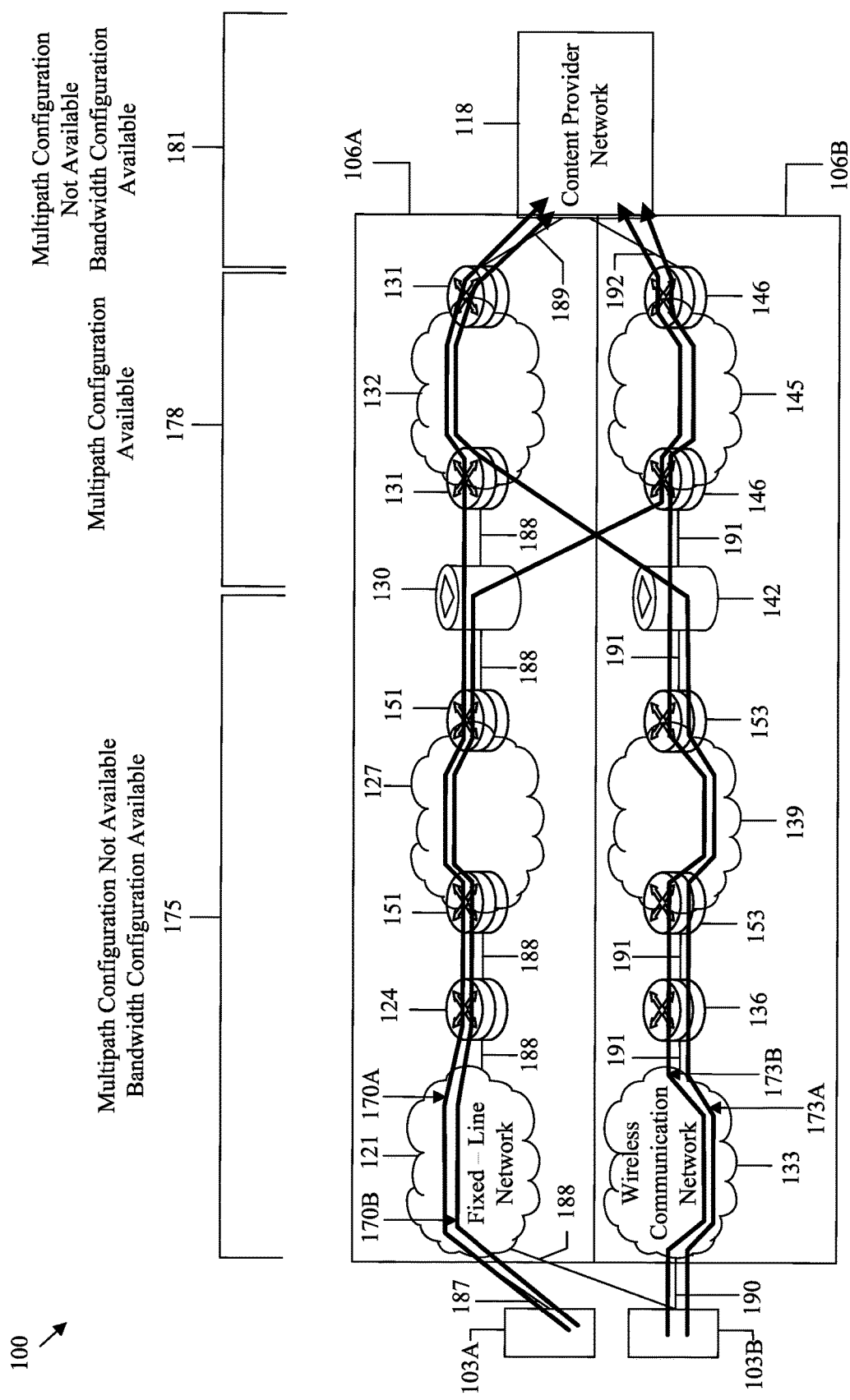
FIG. 1B is a diagram illustrating a network configured to implement path aware networking and Multipath Transmission Control Protocol (MPTCP) according to various embodiments of the disclosure.

FIG. 1B is a diagram illustrating network 100 configured to implement path aware networking and MPTCP according to various embodiments of the disclosure. In FIG. 1B, network 100 includes sections 175, 178, and 181. Section 175 includes the portion of the subnetwork 106A between the fixed-line network 121 and the BNG 130. Section 175 also includes the portion of the subnetwork 106B between the wireless communication network 133 and the PGW 142. Section 178 includes the IP core network 132 of subnetwork 106A and the IP core network 145 of the subnetwork 106B. Section 181 includes the content provider network 118. In addition, different operators may be responsible for different portions of the network 100. Alternatively, network 100 may be controlled by a single operator.

In FIG. 1B, multiple paths 170A-B have been provisioned between end user device 103A and the content provider network 118 using MPTCP, in which the sum of both paths 170A-B is equal to the total bandwidth provided for the end user device 103A. Similarly, multiple paths 173A-B have been provisioned between end user device 103B and the content provider network 118 using MPTCP, in which the sum of both paths 173A-B is equal to the total bandwidth provided for the end user device 103B.

In FIG. 1B, multiple paths are not available throughout the entire network 100. In this example, multiple separate and disjoint paths are not available within sections 175 and 181 of network 100. However, multiple separate and disjoint paths are available within section 178 of network 100.

Since multiple separate and disjoint paths are not available within sections 175 and 181, the portions of paths 170A-B within sections 175 and 181 are converged. That is, the portions of paths 170A-B within section 175 follow along the same nodes, interfaces, and links of the fixed-line network 121, access router 124, and metro network 127 of section 175, and the portions of paths 170A-B within section 181 follow along the same nodes, interfaces, and links of the content provider network 118.

Similarly, the portions of paths 173A-B within sections 175 and 181 are converged. That is, the portions of paths 173A-B within section 175 follow along the same nodes, interfaces, and links of the wireless communications network 133, aggregation router 136, and metro network 139 of section 175, and the portions of paths 173A-B within section 181 follow along the same nodes, interfaces, and links of the content provider network 118.

However, within section 178 of network 100, the portions of paths 170A-B are separate and disjoint, meaning that the paths 170A-B include different nodes, links, and interfaces within section 178. Paths 170A-B do not share a single common node, link, or interface within section 178 of network 100. In the example shown by FIG. 1B, path 170A passes through the IP core network 132 of section 178, but path 170B passes through the IP core network 145 of section 178.

Similarly, the portions of paths 173A-B within section 178 of network 100 are separate and disjoint. Paths 173A-B do not share a single common node, link, or interface within section 178 of network 100. In the example shown by FIG. 1B, path 173B passes through the IP core network 145 of section 178, but path 173A passes through the IP core network 132 of section 178.

Due to the sectional architecture of network 100, in which only certain sections 178 are configured to implement MPTCP, MPTCP may not always provide the maximum benefit as far as bandwidth and throughput for the end user devices 103A-B. This is because MPTCP is configured to implement automated congestion control mechanisms at locations where paths 170A-B and 173A-B are converged or merged together. The congestion control mechanisms are implemented to determine whether congestion is occurring on a node or a link within the network 100. For example, a node or NE along a path 170A-B or 173A-B may determine whether a bandwidth at the node exceeds a predetermined threshold. If so, the node is configured to automatically decrease bandwidth or transmission at that node to control congestion. For example, the node may significantly reduce the amount of data transferred at the node to be equal to or less than the amount of data that would have been transferred if only a single path was used instead of multiple paths 170A-B and 173A-B.

In this scenario, any node within sections 175 or 181 of network 100 along the paths 170A-B and 173A-B may reduce a bandwidth or transmission at that node to implement the MPTCP congestion control mechanisms. If such a bandwidth reduction occurs, then the benefit of having multiple paths 170A-B and 173A-B is eliminated because of the implementation of the MTCP congestion control mechanism. The implementation of the MPTCP congestion control mechanism significantly reduces the bandwidth and increases latency of data transmitted between the end user devices 103A-B and the content provider network 118.

Therefore, end user devices 103A-B cannot utilize MPTCP unless the end user device 103A-B is connected to both the fixed-line network 121 and the wireless communication network 133. In addition, even if the end user device 103A-B is connected to both the fixed-line network 121 and the wireless communication network 133, the end user device 103A-B can only take advantage of the benefits of using MPTCP in the section 178 of network 100 in which multiple paths are available.

Disclosed herein are embodiments directed to guaranteeing a network attribute (e.g., bandwidth, latency, burst size) for an end user device 103A-B regardless of whether the end user device 103A-B is connected to both the fixed-line network 121 and the wireless communication network 133 and regardless of whether the sections 175, 178, and 181 are configured to implement multiple paths. In some embodiments, the end user device 103A-B determines user service expectation data describing expected or desired network attributes, and transmits the user service expectation data to an NE in the network 100. The NE returns path aware network data to the end user device 103A-B indicating the capabilities of the NE relative to the expected network attributes and details regarding how to transmit data packets to the NE in the data plane. The end user devices 103A-B and the NE may then communicate with one another using the path aware network data.

The embodiments disclosed herein are advantageous for various reasons. First, the embodiments disclosed herein enable the end user devices 103A-B to specify the network attributes expected for a certain data transmission by sending the user service expectation data in the control plane. Second, the embodiments disclosed herein enable certain network attributes to be substantially guaranteed to end user devices 103A-B without needing to be connected to both the fixed-line network 121 and the wireless communication network 133, which would normally consume an extensive amount of computing and power resources. Third, the embodiments disclosed herein enable network attributes to be controlled for an end user device 103A-B regardless of whether the network implements MPTCP, or any other multipath protocol.

Figure 2:
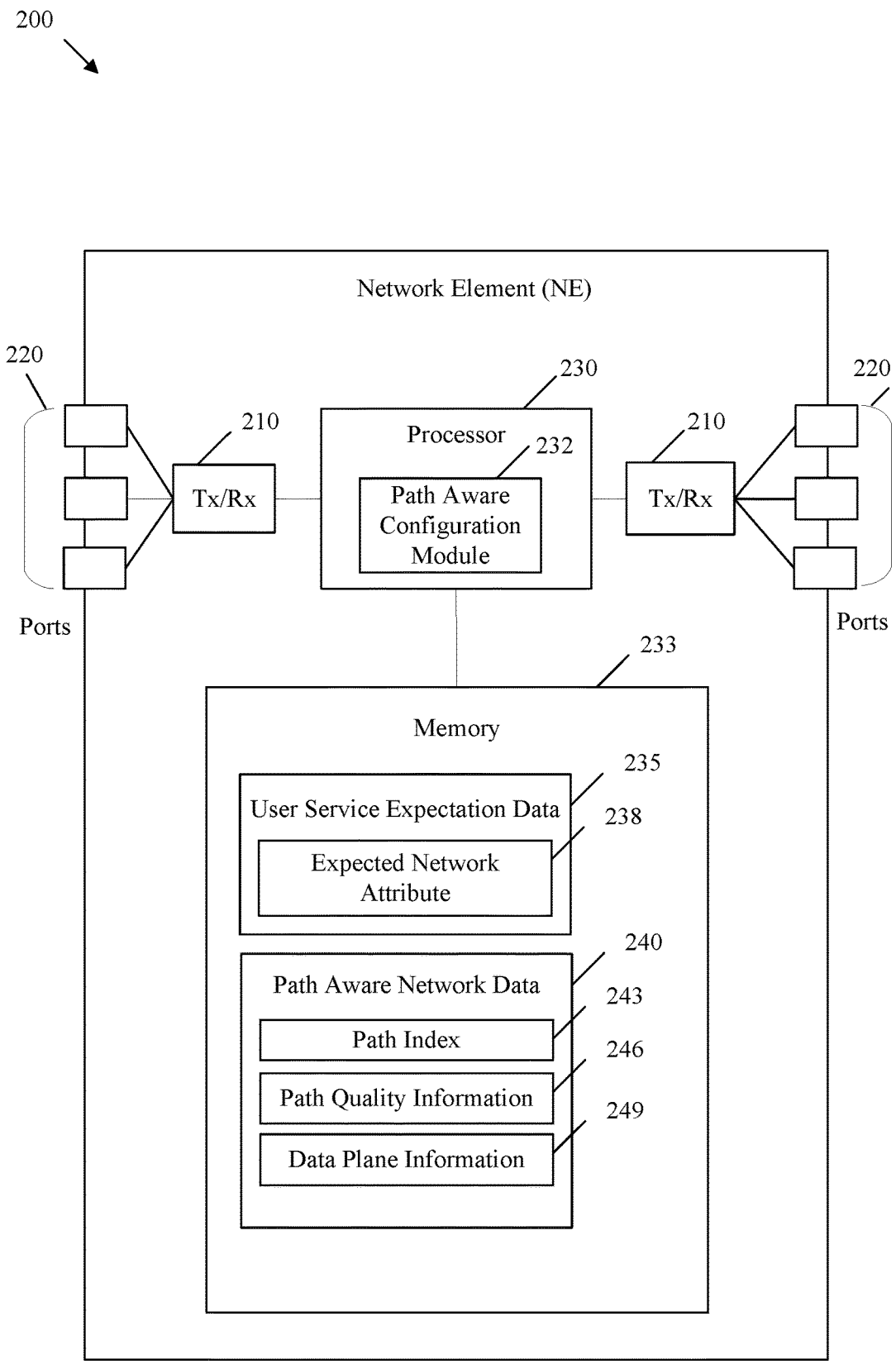
FIG. 2 is a schematic diagram of an NE suitable for implementing the path aware mechanisms described herein.

FIG. 2 is a schematic diagram of an NE 200 suitable for implementing the path aware mechanisms described herein. In an embodiment, the NE 200 may be implemented as the end user device 103A-B (hereinafter referred to as simply "the end user device 103"). In an embodiment, the NE 200 may be implemented as the NEs 131, 146, 151, or 153. In an embodiment, the NE 200 may also be implemented as the access router 124 or the aggregation router 136. In an embodiment, NE 200 may be implemented as an NE within one or more of the fixed-line network 121, wireless communication network 133, metro networks 127 and 139, IP core networks 132 and 145, and the content provider network 118. In an embodiment, the NE 200 is a switch, router, gateway, VM, or other device used in the transportation of packets or information across a network, such as network 100.

NE 200 comprises ports 220, transceiver units (Tx/Rx) 210, a processor 230, and a memory 233. The processor 230 comprises a path aware configuration module 232. Ports 220 are coupled to Tx/Rx 210, which may be transmitters, receivers, or combinations thereof. The Tx/Rx 210 may transmit and receive data via the ports 220. Processor 230 is configured to process data. Memory 233 is configured to store data and instructions for implementing embodiments described herein. The NE 200 may also comprise electrical-to-optical (EO) components and optical-to-electrical (OE) components coupled to the ports 220 and Tx/Rx 210 for receiving and transmitting electrical signals and optical signals.

The processor 230 may be implemented by hardware and software. The processor 230 may be implemented as one or more central processing unit (CPU) chips, logic units, cores (e.g., as a multi-core processor), field-programmable gate arrays (FPGAs), application specific integrated circuits (ASICs), and digital signal processors (DSPs). The processor 230 is in communication with the ports 220, Tx/Rx 210, and memory 233. The path aware configuration module 232 is implemented by processor 230 to execute the instructions for implementing various embodiments discussed herein. For example, the path aware configuration module 232 is configured to determine the user service expectation data 235 and the path aware network data 240 for transmission across the network 100. The inclusion of the path aware configuration module 232 provides an improvement to the functionality of NE 200. The path aware configuration module 232 also effects a transformation of the NE 200 to a different state. Alternatively, the path aware configuration module 232 is implemented as instructions stored in the memory 233.

The memory 233 comprises one or more of disks, tape drives, or solid-state drives and may be used as an over-flow data storage device, to store programs when such programs are selected for execution, and to store instructions and data that are read during program execution. The memory 233 may be volatile and non-volatile and may be read-only memory (ROM), random-access memory (RAM), ternary content-addressable memory (TCAM), and static random-access memory (SRAM).

In an embodiment, the memory 233 is configured to store the user service expectation data 235 and the path aware network data 240. As will be further described below, the user service expectation data 235 includes an expected network attribute 238 indicating a particular network characteristic, such as bandwidth, latency, burst size, desired by the end user device 103 when communicating within network 100. As will be further described below, the path aware network data 240 includes a path index 243, path quality information 246, and data plane information 249.

It is understood that by programming and/or loading executable instructions onto the NE 200, at least one of the processor 230 and/or memory 233 are changed, transforming the NE 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
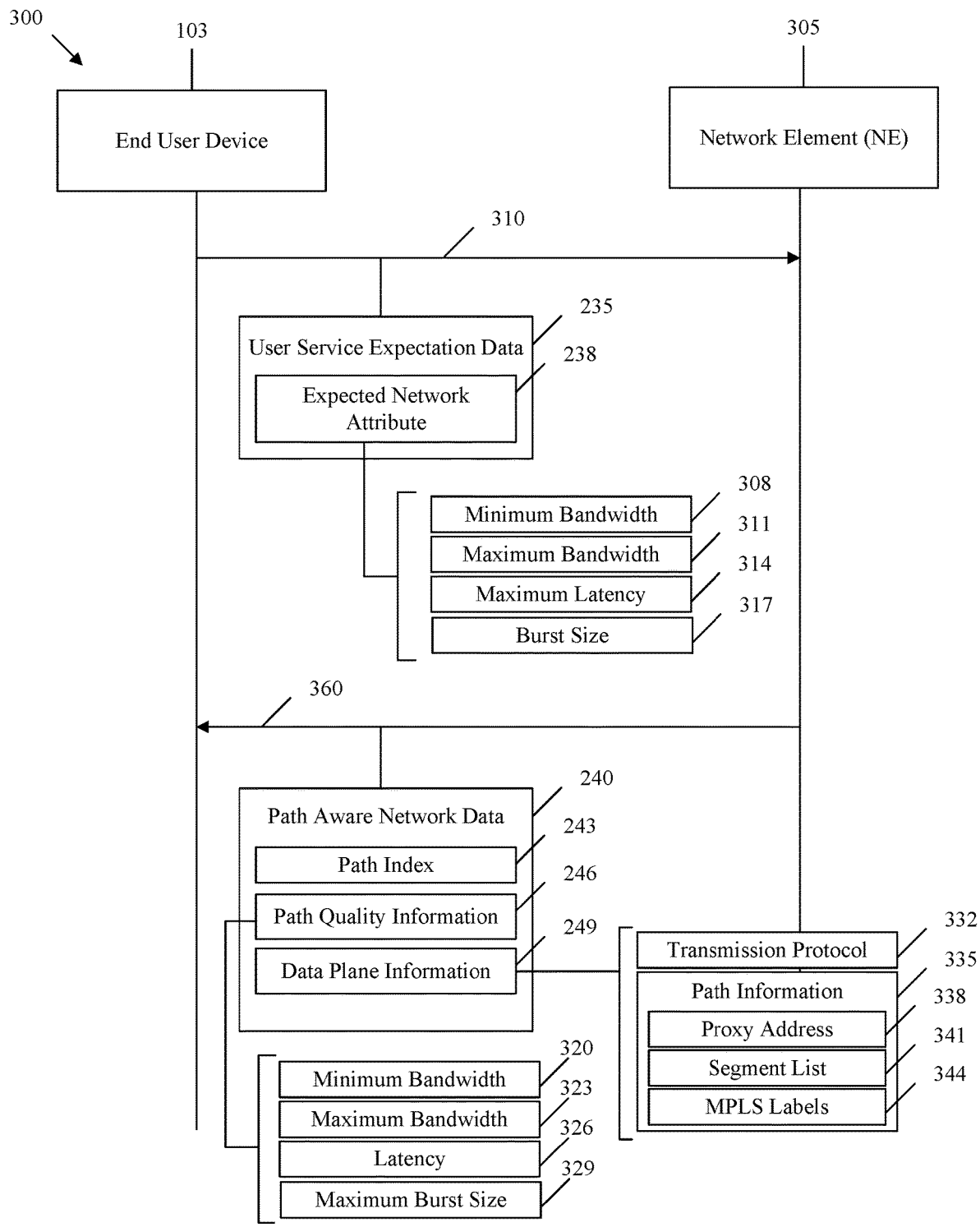
FIG. 3 is a message sequence diagram illustrating communications between an end user device and an NE in the control plane according to various embodiments of the disclosure.

FIG. 3 is a message sequence diagram 300 illustrating communications between an end user device 103 and an NE 305 in the control plane according to various embodiments of the disclosure. The end user device 103 may include components similar to NE 200, and the NE 305 may also include components similar to NE 200. The NE 305 may be positioned anywhere within network 100 between the end user device 103 and the content provider network 118. An operator of the network 100 or a portion of the network 100 may program the NE 305 to include the path aware network data 240. In an embodiment, the message sequence diagram 300 is implemented before the end user device 103 begins communication with the content provider network 118.

At step 310, the end user device 103 transmits user service expectation data 235 to the NE 305. In an embodiment, Tx/Rx 210 transmits the user service expectation data 235 to the NE 305.

In an embodiment, the user service expectation data 235 includes data describing features of one or more paths between the end user device 103 and a destination (e.g., the content provider network 118) that is expected or desired by the end user device 103. The path may be similar to one of the paths 170A-B or 173A-B described above with reference to FIG. 1B.

In an embodiment, the user service expectation data 235 includes an expected network attribute 238 describing a network characteristic expected or desired by the end user device 103 along the path. In an embodiment, the expected network attribute 238 may include at least one of a minimum bandwidth 308, a maximum bandwidth 311, a maximum latency 314, or a burst size 317.

Bandwidth refers to the rate of data transfer, bit rate, or throughput along a link of the path. A minimum bandwidth 308 refers to a minimum amount of bandwidth that should be available along a link of the path between the end user device 103 and the destination. The minimum bandwidth 308 may be expressed in various different units such as bits per second (bit/s), bytes per second (bps), Mbps, kilobytes per second (Kbps), or any other unit that measures bandwidth or throughput. The maximum bandwidth 311 may refer to a maximum amount of bandwidth that is permitted to be forwarded along a link of the path. The maximum bandwidth 311 may also refer to maximum amount of bandwidth already being used along a link of the path. The maximum bandwidth 311 may be expressed in units similar to the minimum bandwidth 308.

Latency refers to a time interval between a time that the end user device 103 sends a packet to the destination and a time that the destination receives the packet. The maximum latency 314 for user data refers to a maximum amount of time that the end user device 103 expects between a time that the NE 305 sends a packet to the destination and a time that the destination receives the packet. The maximum latency 314 may be expressed in units of time, such as microseconds (µs), milliseconds (ms), or seconds (s).

Burst size refers to an amount of data that is allowed to be transmitted as a burst of data along a link of a path at a peak bandwidth rate. The burst size 317 refers to an amount of data that can be transmitted as a burst of data along a link of the path. Burst size may be expressed in various different units such as bits, bytes, megabits (MB), kilobytes (KB), or any other unit that expresses a size of data.

Although FIG. 3 only describes the minimum bandwidth 308, maximum bandwidth 311, maximum latency 314, and burst size 317 as being included in the expected network attribute 238 of the user service expectation data 325, it should be appreciated that the expected network attribute 238 may otherwise include any additional data describing network characteristics expected or requested by the end user device 103. For example, the user service expectation data 235 may include flags, indicating a cost preference, a bit rate preference, and various other preferences of the end user device 103. In an embodiment, the user service expectation data 235 includes a flag indicating whether the end user device 103 requests a higher bandwidth or a shorter latency for the path. A cost preference may indicate whether the user prefers a certain bandwidth or latency when receiving and transmitting user data long the path. In an embodiment, the user service expectation data 235 includes a reliability of the path requested by the user operating the end user device 103.

In an embodiment, the NE 305 may store the user service expectation data 235 locally at a memory 233 of the NE. In another embodiment, the NE 305 need not store the user service expectation data 235. In response to receiving the user service expectation data 235, the NE 305 is triggered to generate path aware network data 240 describing features of the NE 305.

In an embodiment, the NE 305 generates the path aware network data 240, which includes a path index 243, path quality information 246, and data plane information 249. In an embodiment, the path index 243 is a value identifying the path between the end user device 103 and a destination (e.g., content provider network 118). The path may include multiple NEs, links, and interfaces between the end user device 103 and the destination, and one of the multiple NEs included on the path is NE 305.

In an embodiment, the path index 243 is an index significant to a network domain within the network 100 and may be used for purposes of network management and administration as well. The path index 243 may be unique for an Interior Gateway Protocol (IGP) domain, a Border Gateway Protocol (BGP) Autonomous System (AS) domain, and/or an AS domain.

In an embodiment, the path quality information 246 describes network characteristics of the path identified by the path index 243. In an embodiment, the path quality information 246 includes at least one of minimum bandwidth 320, a maximum bandwidth 323, a maximum latency 326, and a maximum burst size 329. The minimum bandwidth 320 refers to a minimum amount of bandwidth that is present on a link or permitted to be forwarded on a link connected to NE 305 on the path. The minimum bandwidth 320 may be expressed in various different units, such as bit/s, bps, Mbps, Kbps, or any other unit that measures bandwidth or throughput. The maximum bandwidth 323 refers to a maximum amount of bandwidth that is permitted to be transmitted along a link connected to NE 305 on the path. The maximum bandwidth 323 may be expressed in units similar to the minimum bandwidth 320.

The latency 326 refers to a time interval that occurs between a time that the NE 305 forwards a packet to the destination on the path and a time that the destination receives the packet. The latency 326 may be expressed in units of time, such as microseconds, milliseconds, or seconds.

The maximum burst size 329 refers to a maximum amount of data that is permitted to be transmitted as a burst of data along a link connected to NE 305 on the path. The maximum burst size 329 may be expressed in various different units, such as bits, bytes, MB, KB, or any other unit that expresses a size of data. Although FIG. 3 only describes the minimum bandwidth 320, latency 326, and maximum burst size 329 as being included in the path quality information 246, it should be appreciated that the path quality information 246 may otherwise include any additional data describing network characteristics supported by NE 305.

In an embodiment, the NE 305 already stores the path aware network data 240 after obtaining the path aware network data 240 from an operator of the network 100. In an embodiment, the NE 305 filters the path aware network data 240 based on the user service expectation data 235 received from the end user device 103. For example, when the NE 305 receives user service expectation data 235 including a maximum bandwidth 311, maximum latency 314, and a burst size 317, the NE 305 is configured to determine a corresponding maximum bandwidth 323, latency 326, and maximum burst size 329 relative to the NE 305. In an embodiment, the path quality information 246 forwarded back to the end user device 103 may only include the maximum bandwidth 323, latency 326, and maximum burst size 329 relative to the NE 305. In another embodiment, the NE 305 populates the path quality information 246 to include the minimum bandwidth 320, latency 326, and maximum burst size 329, regardless of the information included in the user service expectation data 235.

In an embodiment, the data plane information 249 includes information describing how the end user device 103 may transmit data packets to the NE 305 or along the path. In an embodiment, the data plane information 249 includes a transmission protocol 332 and path information 335. The transmission protocol 332 may be a value representing a transmission protocol by which the end user device 103 should encapsulate and forward data packets to the NE 305 or along the path in the data plane. For example, the transmission protocol 332 may refer to IPv6, SRv6, or path aware routing, details of which will be further described below.

The path information 335 may include information describing addresses and locations that can be encoded according to the transmission protocol 332 to forward data packets to the NE 305 or along the path. In an embodiment, the path information 335 may include a proxy address 338, a segment list 341, or MPLS labels 344. In an embodiment, the proxy address 338 may include an IPv6 address of a proxy in the network 100 toward which the end user device 103 should forward data packets. The proxy in the network 100 may be configured to encapsulate and/or decapsulate data packets before continuing transmission along the path to the destination.

The segment list 341 may include a list of segment identifiers or addresses of segments along the path. A segment may refer to more than one node, link, or interface along the path to the destination. In an embodiment in which the network 100 implements SRv6, the segment list 341 is added to each data packet, and each hop on the path determines a next hop on the path based on the segment list 341.

The MPLS labels 344 may include one or more MPLS labels that may be used to transmit data packets along the path in the network 100. In an embodiment in which the network 100 implements MPLS, the MPLS labels 344 may be pushed onto each data packet being transmitted along the path to destination.

In an embodiment, the NE 305 may generate the path information 335 based on the transmission protocol 332 supported by the NE 305. For example, when the network 100 implements SRv6, the path information 335 may include the segment list 341 and exclude the proxy address 338 and the MPLS labels 344. Similarly, when the network 100 implements MPLS, the path information 335 may include the MPLS labels 344 and exclude the proxy address 338 and the segment list 341. In an embodiment in which the network 100 implements path aware routing, path information 335 may include the proxy address 338 and exclude the segment list 341 and the MPLS labels 344.

At step 360, the NE 305 transmits the path aware network data 240 to the end user device 103. In an embodiment, the Tx/Rx 210 transmits the path aware network data 240 to the end user device 103.

Although FIG. 3 only shows the NE 305 sending one path aware network data 240 for a single path index 243, the NE 305 may send multiple sets of path aware network data 240 for different path indexes 243. The path quality information 246 and the data plane information 249 in each of the different sets of path aware network data 240 may represent the path identified in the path index 243.

After the end user device 103 receives the multiple different sets of path aware network data 240, the end user device 103 selects a path based on the different sets of path aware network data 240. In an embodiment, the end user device 103 selects a path based on whether the expected network attribute 238 matches or substantially matches the path quality information 246.

In one embodiment, the user service expectation data 235 may be carried in a new message that is transmitted from the end user device 103 to the NE 305. In another embodiment, the user service expectation data 235 may be carried in an existing message already defined an existing standard or protocol. For example, the user service expectation data 235 may be carried in a router solicitation message of the Neighbor Discovery for IPv6 protocol, as defined by the Network Working Group (NWG) Request for Comments (RFC) 4861 draft standard document entitled "Network Discovery for IP Version 6 (IPv6)," by T. Narten, et. al., dated September 2007 (hereinafter referred to as the "Neighbor Discovery for IPv6 Document"). As another example, the user service expectation data 235 may be carried in a SOLICIT or REQUEST message of the Dynamic Host Configuration Protocol for IPv6 (DHCPv6) protocol, as defined by the NWG RFC 3315 draft standard document entitled "Dynamic Host Configuration Protocol for IPv6 (DHCPv6)," by R. Droms, et. al., dated Jul. 2003 (hereinafter referred to as the "DHCPv6 Document").

Similarly, the path aware network data 240 may be carried in a new message that is transmitted from the NE 305 to the end user device 103. In another embodiment, the path aware network data 240 may be carried in an existing message already defined in an existing standard or protocol. For example, the path aware network data 240 may be carried in a router advertisement message of the neighbor discovery for IPv6 protocol, as defined by the Neighbor Discovery for IPv6 Document. As another example, the path aware network data 240 may be carried in an ADVERTISE or REPLY message of the DHCPv6 protocol, as defined by the DHCPv6 Document.

Figure 4A:
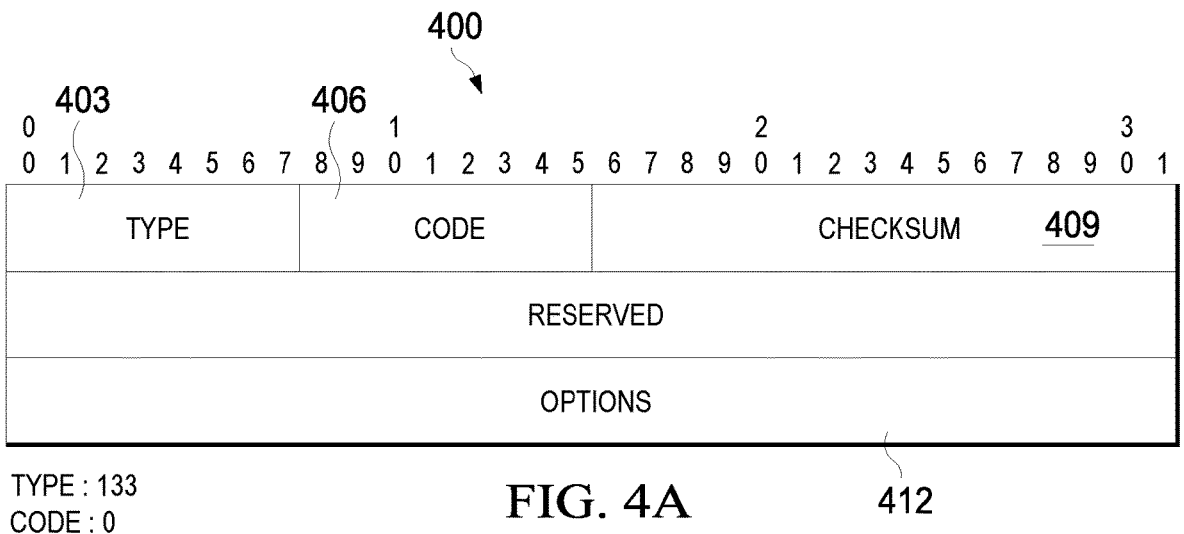
FIGS. 4A-B are type length value (TLV) diagrams illustrating how the user service expectation data is carried in a router solicitation message according to various embodiments of the disclosure.
Figure 4B:
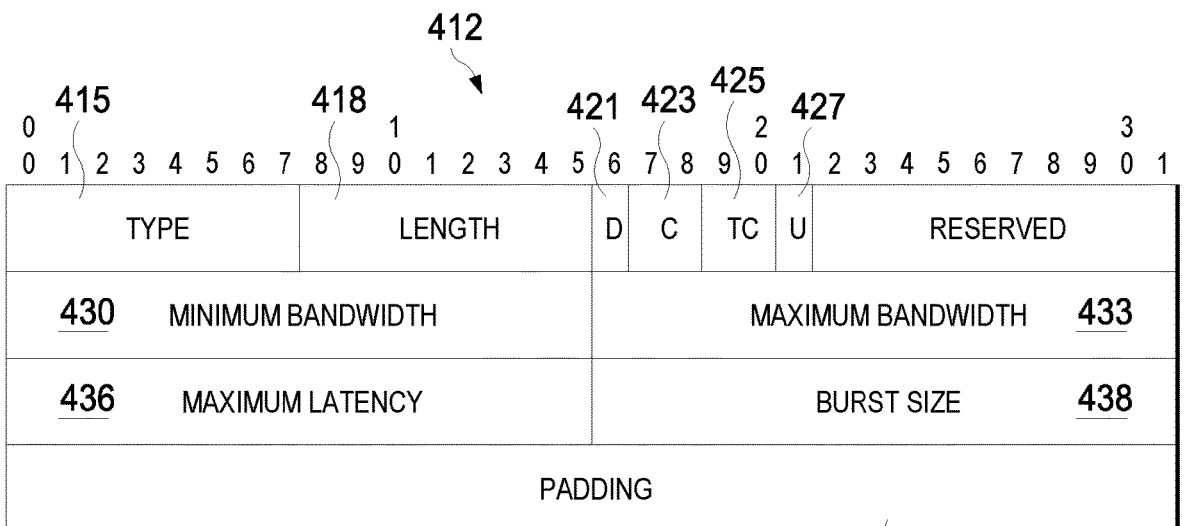

FIGS. 4A-B are type length value (TLV) diagrams illustrating how the user service expectation data is carried in a router solicitation message, as defined by the Neighbor Discovery for IPv6 Document, according to various embodiments of the disclosure. In particular, FIG. 4A is a TLV diagram illustrating a format of a standard router solicitation message 400 as defined by the Neighbor Discovery for IPv6 Document. The standard router solicitation message 400 includes a type field 403, a code field 406, a checksum field 409, reserved bits that are reserved for future use, and one or more options fields 412. The type field 403 includes a value (133) indicating that the message is a router solicitation message 400. The code field 406 is filled with 0. The checksum field 406 includes an Internet Control Message Protocol (ICMP) checksum value. The options field 412 is reserved for optional data that may be included in the router solicitation message 400. In an embodiment, the user service expectation data 235 is carried the options field 412.

FIG. 4B is a TLV diagram illustrating a format of the options field 412 capable of carrying one or more expected network attributes 238 of the user service expectation data 235 according to various embodiments of the disclosure. The options field 412 includes a type field 415, a length field 418, a "d" flag 421, a "c" flag 423, a "TC" flag 425, a "u" field 427, reserved bits, a minimum bandwidth field 430, a maximum bandwidth field 433, a maximum latency field 436, a burst size field 438, and bit padding 439.

In an embodiment, the type field 415 carries a value indicating that the options field 412 includes user service expectation data 235. The value may be assigned by the Internet Assigned Numbers Authority (IANA). The length field 418 carries a value indicating the length of the options field 412, including the type field 415 and the length field 418, in units of 8 octets.

The "d" flag 421 is a flag, or bit, that is set to indicate a direction by which the router solicitation message 400 is being transmitted. For example, the "d" flag 421 may be set to 1 when the router solicitation message 400 is being transmitted downstream, and the "d" flag 421 may be set to 0 when the router solicitation message 400 is being transmitted upstream.

The "c" flag 423 is a flag, or bit, that is set to indicate a cost preference of a user operating the end user device 103. For example, the "c" flag 423 may be set to 1 when the user prefers a shorter latency path, and the "c" flag 423 may be set to 0 when user prefers a higher bandwidth path.

The "TC" flag 425 is a flag, or bit, that is set to indicate a traffic category preferred by the user. For example, the "TC" flag 425 may be set to 1 when the user prefers a variable bit rate, and the "TC" flag 425 may be set to 0 when the user prefers a constant bit rate. When the "TC" flag 425 is set to indicate that the user prefers a variable bit rate, the options field 412 may include a minimum bandwidth 308, maximum bandwidth 311, and/or a burst size 317. When the "TC" flag 425 is set to indicate that the user prefers a constant bit rate, the options field 412 may only need to include a minimum bandwidth 308.

The "u" field 427 includes a bit that is set to indicate a unit of the time interval included in the maximum latency field 436. For example, the "u" field 427 is set to 1 when the unit of the time interval included in the maximum latency field 436 is ms, and the "u" field 427 is set to 1 when the unit of the time interval included in the maximum latency field 436 is μs.

The minimum bandwidth field 430 carries the minimum bandwidth 308 when the user specifies an expected minimum bandwidth 308 for a path between the end user device 103 and a destination. The unit of the minimum bandwidth 308 carried in the minimum bandwidth field 430 is Mbps.

The maximum bandwidth field 433 carries the maximum bandwidth 311 when the user specifies an expected maximum bandwidth 311 for a path between the end user device 103 and a destination. The unit of the maximum bandwidth 311 carried in the minimum bandwidth field 433 is Mbps.

The maximum latency field 436 carries the maximum latency 314 when the user specifies an expected maximum latency 314 for a path between the end user device 103 and a destination. The burst size field 438 carries the burst size 317 when the user specifies an expected burst size 317 for a path between the end user device 103 and a destination. The unit of the burst size 317 carried in the burst size field 438 is mb.

Figure 5A:
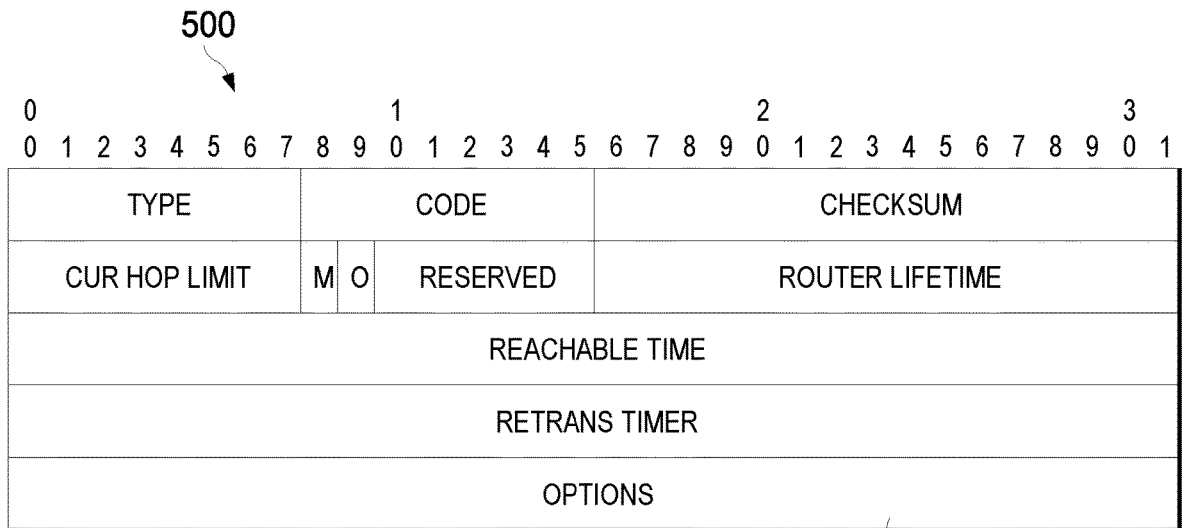
FIGS. 5A-E are TLV diagrams illustrating how the path aware network data is carried in a router advertisement message according to various embodiments of the disclosure.

FIGS. 5A-E are TLV diagrams illustrating how the path aware network data is carried in a router advertisement message, as defined by the Neighbor Discovery for IPv6 Document, according to various embodiments of the disclosure. In particular, FIG. 5A is a TLV diagram illustrating a format of a standard router advertisement message 500 as defined by the Neighbor Discovery for IPv6 Document. The standard router advertisement message 500 includes various ICMP fields, such as a type field, a code field, a checksum field, a current hop limit field, various flags, a router lifetime field, a reachable time field, and a retransmitted timer field. The standard router advertisement message 500 also includes an options field 503, which is reserved for optional data that may be included in the router advertisement message 500. In an embodiment, the path aware network data 240 is carried the options field 503.

Figure 5B:
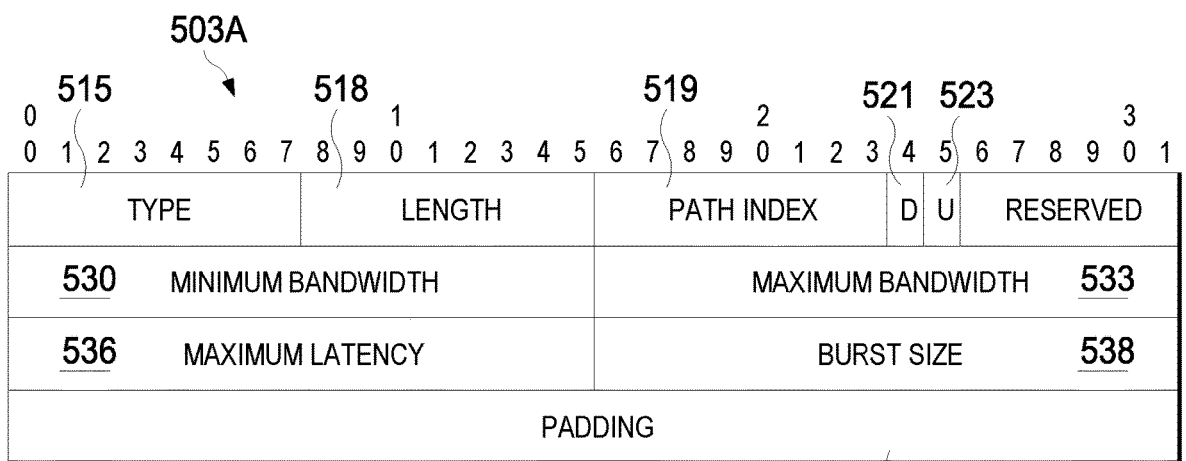

FIG. 5B is a TLV diagram illustrating a format of an options field 503A capable of carrying the path index 243 and the path quality information 246 of the path aware network data 240 according to various embodiments of the disclosure. The options field 503A includes a type field 515, a length field 518, a path index field 519, a "d" flag 521, a "u" field 523, reserved bits, a minimum bandwidth field 530, a maximum bandwidth field 533, a maximum latency field 536, a burst size field 538, and bit padding 539.

In an embodiment, the type field 515 carries a value indicating that the options field 503A includes path aware network data 240. The value may be assigned by the IANA. The length field 518 carries a value indicating the length of the options field 503A, including the type field 515 and the length field 518, in units of 8 octets, including the padding bits in the bit padding 539.

The path index field 519 carries the path index 243, which identifies the path including NE 305 sending the router advertisement message 500. The "d" flag 521 is a flag, or bit, that is set to indicate a direction by which the router advertisement message 500 is being transmitted. For example, the "d" flag 521 may be set to 1 when the router advertisement message 500 is being transmitted downstream, and the "d" flag 521 may be set to 0 when the router advertisement message 500 is being transmitted upstream.

The "u" field 523 includes a bit that is set to indicate a unit of the time interval included in the maximum latency field 536. For example, the "u" field 523 is set to 1 when the unit of the time interval included in the maximum latency field 536 is ms, and the "u" field 523 is set to 1 when the unit of the time interval included in the maximum latency field 536 is μs.

The minimum bandwidth field 530 carries the minimum bandwidth 320 supported by the NE 305 sending the router advertisement message 500. The unit of the minimum bandwidth 320 carried in the minimum bandwidth field 530 is Mbps.

The maximum bandwidth field 533 carries the maximum bandwidth 323 supported by the NE 305 sending the router advertisement message 500. The unit of the maximum bandwidth 323 carried in the minimum bandwidth field 533 is Mbps.

The maximum latency field 536 carries the latency 326 occurring at the NE 305 sending the router advertisement message 500. The burst size field 538 carries the maximum burst size 329 that the NE 305 is capable of transmitting along a connected link. The unit of the maximum burst size 329 carried in the burst size field 538 is mb.

Figure 5C:
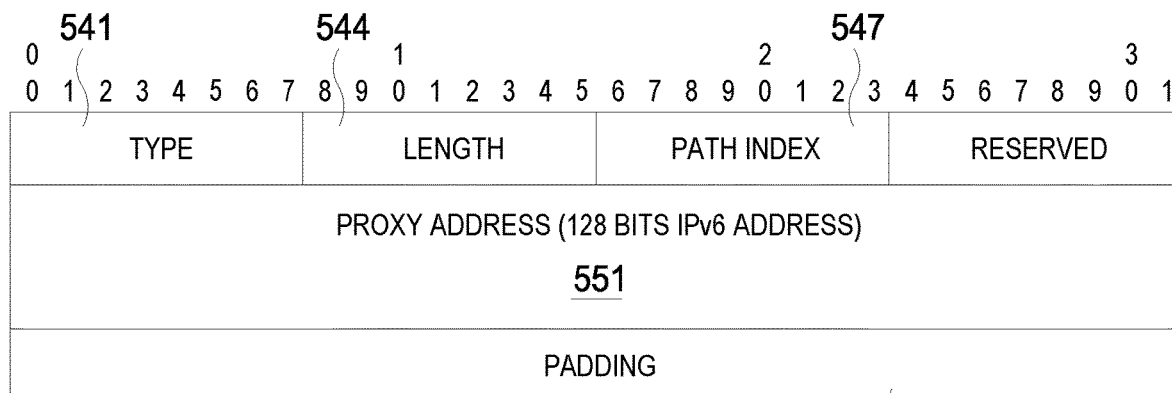

FIG. 5C is a TLV diagram illustrating a format of another options field 503B capable of carrying the path index 243 and the proxy address 338 of the path aware network data 240 according to various embodiments of the disclosure. As shown by FIG. 5C, the options field 503B includes a type field 541, a length field 544, a path index field 547, a proxy address field 551, and bit padding 553.

The type field 541 includes a value indicating that the options field 503B carries the proxy address 338. The value included in the type field 541 may be assigned by the IANA. The length field 544 carries a value indicating the length of the options field 503B including the type field 541, length field 544, and the bit padding 553, in units of 8 octets. The path index field 547 carries the path index 243. The proxy address field 551 carries the proxy address 338 of a proxy that the end user device 103 should send subsequent data packets to for processing when the network 100 implements path aware routing, which, in an embodiment, is a customization of IPv6 routing. The proxy address 338 of the proxy may be an IPv6 address of 128 bits.

Figure 5D:
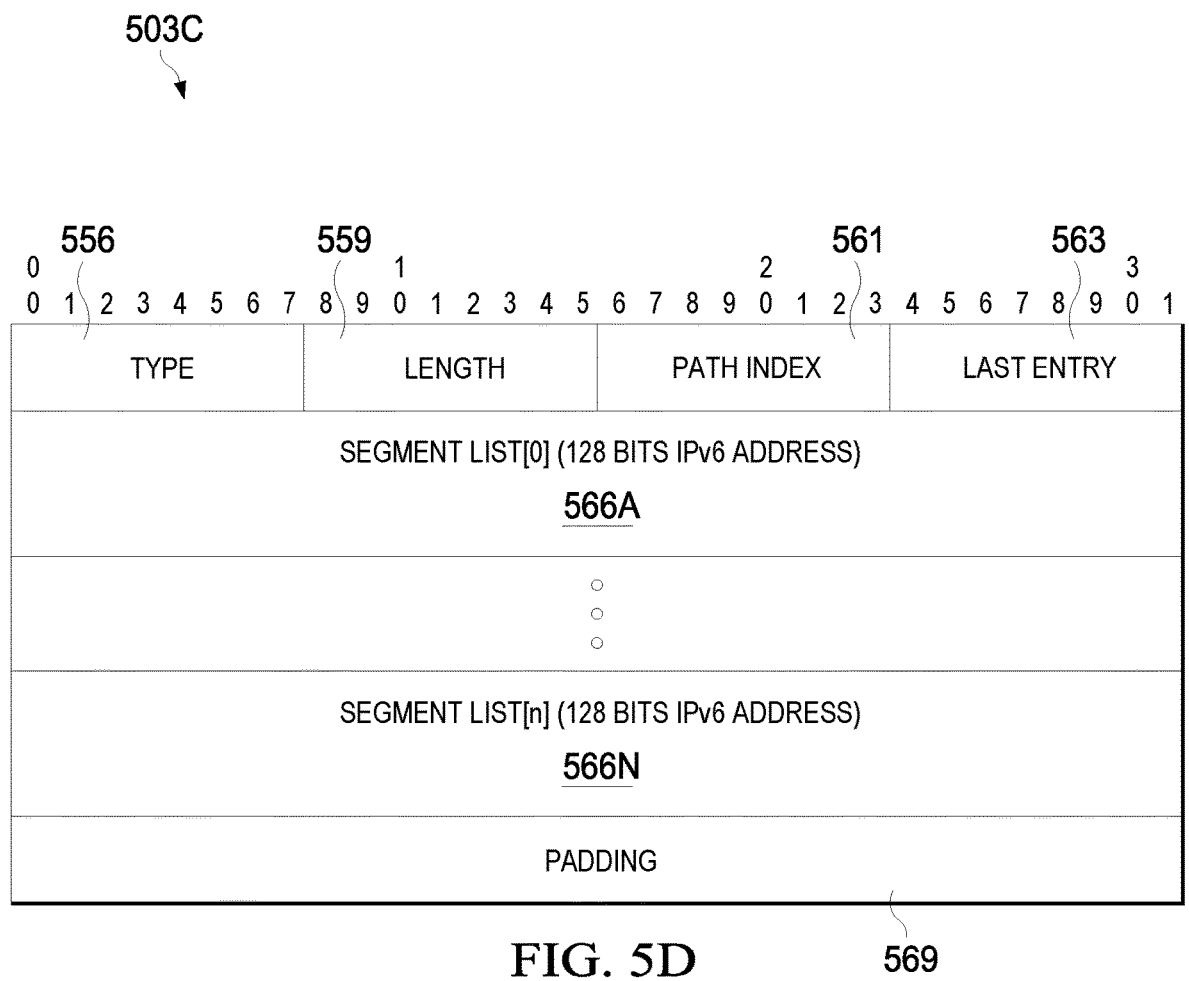

FIG. 5D is a TLV diagram illustrating a format of another options field 503C capable of carrying the path index 243 and the segment list 341 of the path aware network data 240 according to various embodiments of the disclosure. As shown by FIG. 5D, the options field 503D includes a type field 556, a length field 559, a path index field 561, a last entry field 563, one or more segment identifier fields 566A-N, and bit padding 569.

The type field 556 includes a value indicating that the options field 503C carries the segment list 341 in the segment identifier fields 566A-N. The value included in the type field 556 may be assigned by the IANA. The length field 559 carries a value indicating the length of the options field 503C including the type field 556, length field 559, and the bit padding 569, in units of 8 octets. The path index field 561 carries the path index 243. The last entry field 563 indicates whether the router advertisement message 500 is the last entry of the segment list 341. The segment identifier fields 566A-N each carry an address or an identifier or a segment in the segment list 341. For example, the segment identifier 566A carries an IPv6 address of a first segment in the segment list 341, and the segment identifier 566N carries an IPv6 address of a last segment in the segment list 341.

Figure 5E:
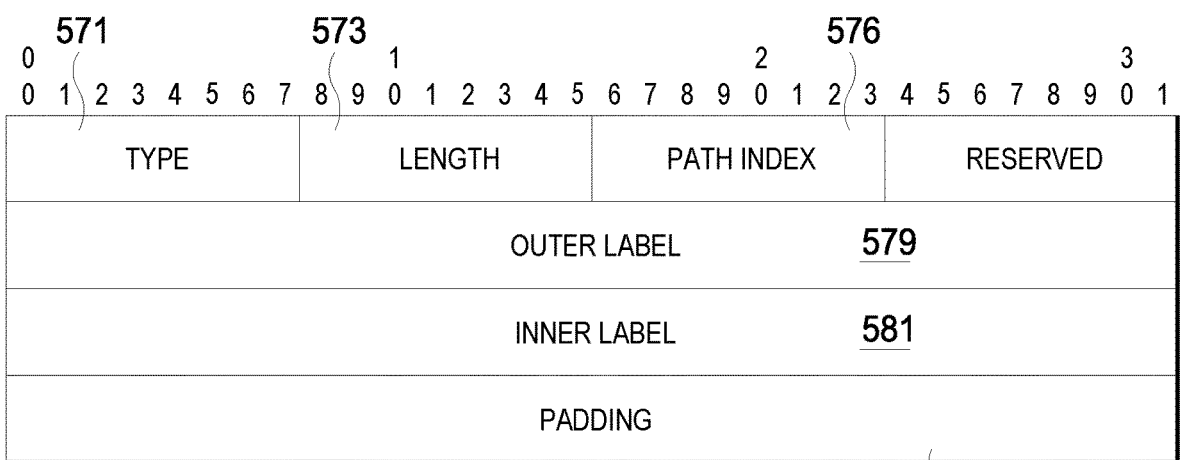

FIG. 5E is a TLV diagram illustrating a format of another options field 503D capable of carrying the path index 243 and the MPLS labels 344 of the path aware network data 240 according to various embodiments of the disclosure. As shown by FIG. 5E, the options field 503D includes a type field 571, a length field 573, a path index field 576, reserved bits, an outer label field 579, an inner label field 581, and bit padding 584.

The type field 571 includes a value indicating that the options field 503D carries the MPLS labels 344 in the outer label field 579 and the inner label field 581. The value included in the type field 571 may be assigned by the IANA. The length field 573 carries a value indicating the length of the options field 503D including the type field 571, length field 573, and the bit padding 584, in units of 8 octets. The path index field 576 carries the path index 243.

The outer label field 579 carries an outmost MPLS label that is pushed onto a data packet when transmitting the data packet through a path in a network 100 implementing MPLS. The inner label field 581 carries an inner MPLS label, which may normally be for the path index association. The inner MPLS label is also pushed onto a data packet for transmission along a path in the network 100 implementing MPLS.

Figure 6A:
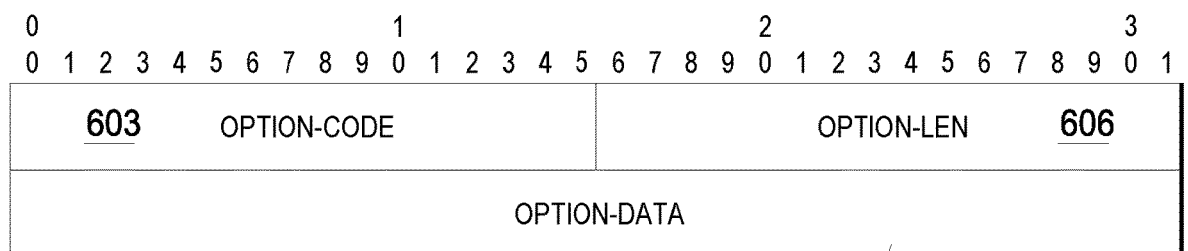
FIGS. 6A-B are TLV diagrams illustrating how the user service expectation data is carried in a DHCP SOLICIT or REQUEST message according to various embodiments of the disclosure.
Figure 6B:
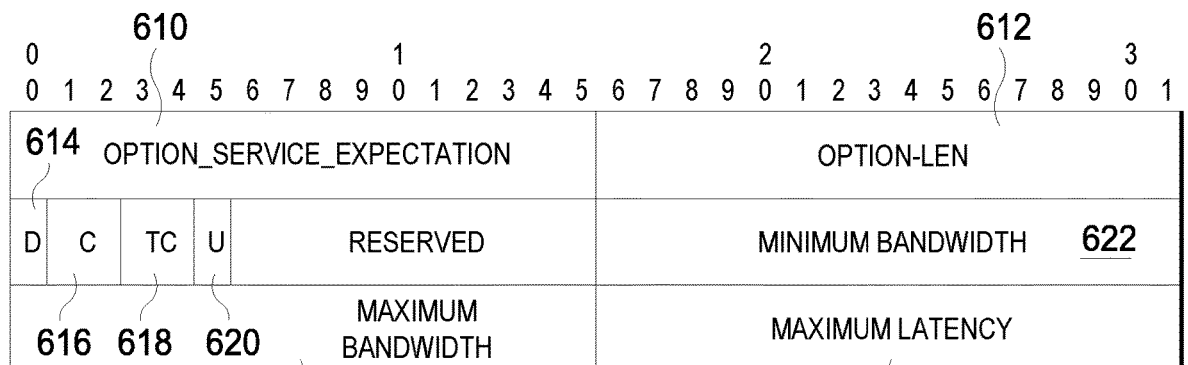

FIGS. 6A-B are TLV diagrams illustrating how the user service expectation data is carried in a DHCP SOLICIT or REQUEST message, as defined by the DHCPv6 Document, according to various embodiments of the disclosure. In particular, FIG. 6A is a TLV diagram illustrating a format of a standard DHCP option 600 as defined by the DHCPv6 Document, which is included in both the DHCP SOLICIT and REQUEST messages. The standard DHCP option 600 includes an option code field 603, an option length field 606, and option data fields 608. The option code field 603 includes an unsigned integer identifying the specific operation type carried in the DHCP option 600. The option length field 606 carries an unsigned integer giving the length of the option data field 608 in this DHCP option 600 in octets. The option data field 608 includes the data for the DCHP option 600, and the format of this data depends on the definition of the DHCP option.

FIG. 6B is a TLV diagram illustrating a format of a DHCP option 600A capable of carrying one or more expected network attributes 238 of the user service expectation data 235 according to various embodiments of the disclosure. The DHCP option 600A includes an option code field 610, an option length field 612, a "d" flag 614, a "c" flag 616, a "TC" flag 618, a "u" field 620, reserved bits, a minimum bandwidth field 622, a maximum bandwidth field 624, and a maximum latency field 626.

In an embodiment, the option code field 610 carries a value indicating that the DHCP option 600A includes user service expectation data 235. The value may be assigned by the IANA. The option length field 612 carries a value indicating the length of the DHCP option 600A, not including the option code field 610 and the option length field 612, in units of 8 octets.

The "d" flag 614 is a flag, or bit, that is set to indicate a direction by which the DHCP option 600A is being transmitted. For example, the "d" flag 614 may be set to 1 when the DHCP option 600A is being transmitted downstream, and the "d" flag 614 may be set to 0 when the DHCP option 600A is being transmitted upstream.

The "c" flag 616 is a flag, or bit, that is set to indicate a cost preference of a user operating the end user device 103. For example, the "c" flag 616 DHCP option 600A may be set to 1 when the user prefers a shorter latency path, and the "c" flag 616 DHCP option 600A may be set to 0 when user prefers a higher bandwidth path.

The "TC" flag 618 is a flag, or bit, that is set to indicate a traffic category preferred by the user. For example, the "TC" flag 618 may be set to 1 when the user prefers a variable bit rate, and the "TC" flag 618 may be set to 0 when the user prefers a constant bit rate. When the "TC" flag 618 is set to indicate that the user prefers a variable bit rate, the DHCP option 600A may include a minimum bandwidth 308, maximum bandwidth 311, and/or a burst size 317. When the "TC" flag 618 is set to indicate that the user prefers a constant bit rate, the DHCP option 600A may only need to include a minimum bandwidth 308.

The "u" field 620 includes a bit that is set to indicate a unit of the time interval included in the maximum latency field 626. For example, the "u" field 620 is set to 1 when the unit of the time interval included in the maximum latency field 626 is ms, and the "u" field 620, is set to 0 when the unit of the time interval included in the maximum latency field 626 is µs.

The minimum bandwidth field 622 carries the minimum bandwidth 308 when the user specifies an expected minimum bandwidth 308 for a path between the end user device 103 and a destination. The unit of the minimum bandwidth 308 carried in the minimum bandwidth field 622 is Mbps.

The maximum bandwidth field 624 carries the maximum bandwidth 311 when the user specifies an expected maximum bandwidth 311 for a path between the end user device 103 and a destination. The unit of the maximum bandwidth 311 carried in the maximum bandwidth field 624 is Mbps. The maximum latency field 626 carries the maximum latency 314 when the user specifies an expected maximum latency 314 for a path between the end user device 103 and a destination.

Figure 7A:
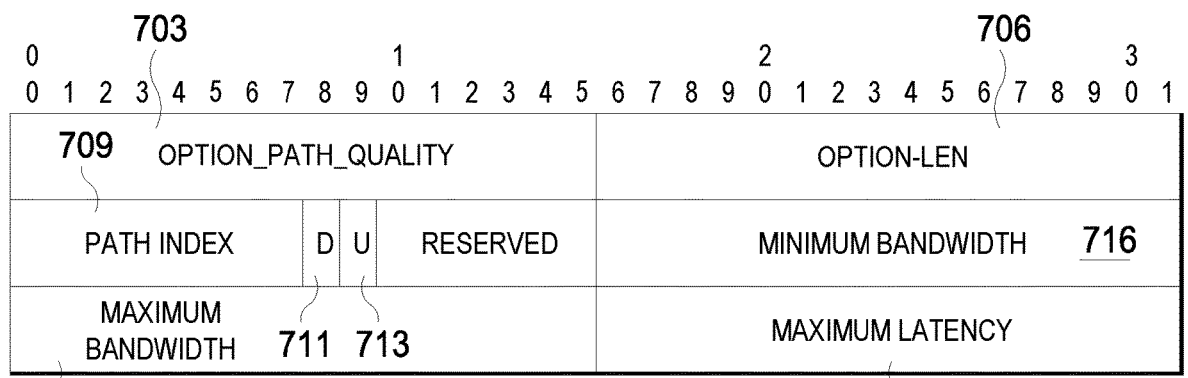
FIGS. 7A-D are TLV diagrams illustrating how the path aware network data is carried in a DHCP option according to various embodiments of the disclosure.

FIGS. 7A-E are TLV diagrams illustrating how the path aware network data 240 is carried in a DHCP option 600, as defined by the DHCPv6 Document, according to various embodiments of the disclosure. In particular, FIG. 7A is a TLV diagram illustrating a format of a DCHP option 600B capable of carrying the path index 243 and the path quality information 246 of the path aware network data 240 according to various embodiments of the disclosure. The DCHP option 600B includes an option code field 703, an option length field 706, a path index field 709, a "d" flag 711, a "u" field 713, reserved bits, a minimum bandwidth field 716, a maximum bandwidth field 718, and a maximum latency field 720.

In an embodiment, the option code field 703 carries a value indicating that the DHCP option 600B includes the path quality information 246. The value may be assigned by the IANA. The option length field 706 carries a value indicating the length of the DHCP option 600B, not including the option code field 703 and the option length field 706, in units of 8 octets.

The path index field 709 carries the path index 243. The "d" flag 711 is a flag, or bit, that is set to indicate a direction by which the DHCP option 600B is being transmitted. For example, the "d" flag 711 may be set to 1 when the DHCP option 600B is being transmitted downstream, and the "d" flag 711 may be set to 0 when the DHCP option 600B is being transmitted upstream.

The "u" field 713 includes a bit that is set to indicate a unit of the time interval included in the maximum latency field 720. For example, the "u" field 713 is set to 1 when the unit of the time interval included in the maximum latency field 720 is ms, and the "u" field 713 is set to 0 when the unit of the time interval included in the maximum latency field 720 is µs.

The minimum bandwidth field 716 carries the minimum bandwidth 320 supported by the NE 305 sending the DHCP option 600B. The unit of the minimum bandwidth 320 carried in the minimum bandwidth field 716 is Mbps.

The maximum bandwidth field 718 carries the maximum bandwidth 323 supported by the NE 305 sending the DHCP option 600B. The unit of the maximum bandwidth 323 carried in the maximum bandwidth field 718 is Mbps. The maximum latency field 720 carries the latency 326 occurring at the NE 305 sending the DHCP option 600B.

Figure 7B:
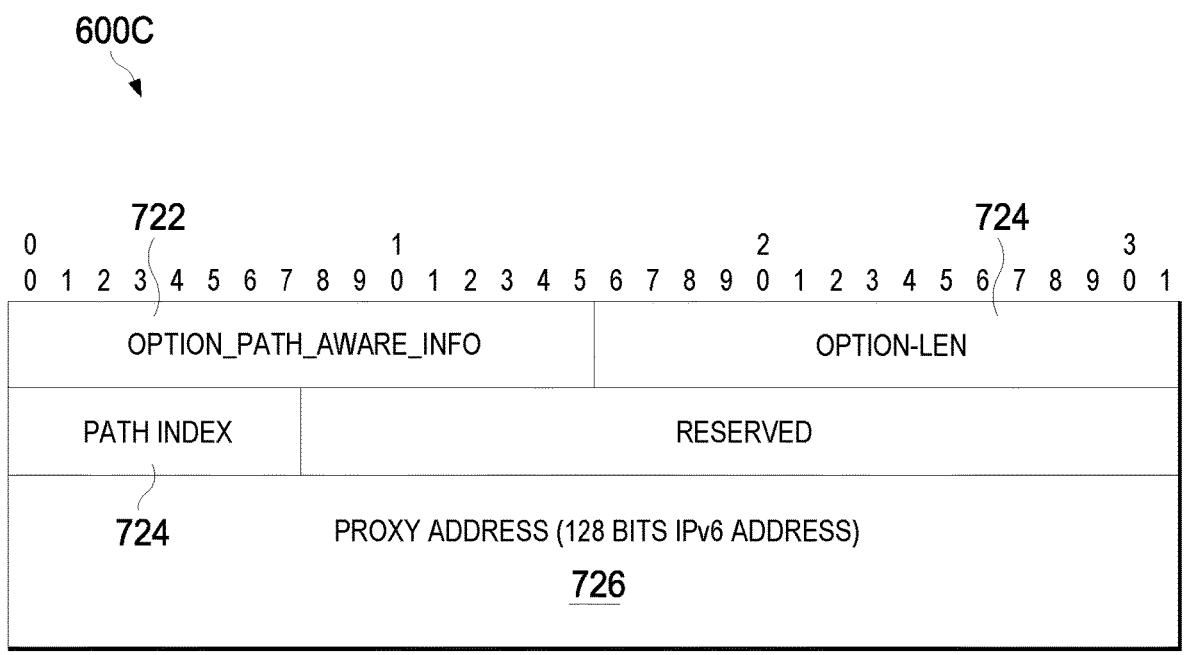

FIG. 7B is a TLV diagram illustrating a format of another DHCP option 600C capable of carrying the path index 243 and the proxy address 338 of the path aware network data 240 according to various embodiments of the disclosure. As shown by FIG. 7B, the DHCP option 600C includes an option code field 722, an option length field 724, a path index field 724, reserved bits, and a proxy address field 726.

The option code field 722 includes a value indicating that the DHCP option 600C carries the proxy address 338. The value included in the option code field 722 may be assigned by the IANA. The option length field 724 carries a value indicating the length of the DHCP option 600C, not including the option code field 722 and the option length field 724, in units of 8 octets. The path index field 724 carries the path index 243. The proxy address field 726 carries an address of a proxy that the end user device 103 should send subsequent data packets to for processing. The address of the proxy may be an IPv6 address of 128 bits.

Figure 7C:
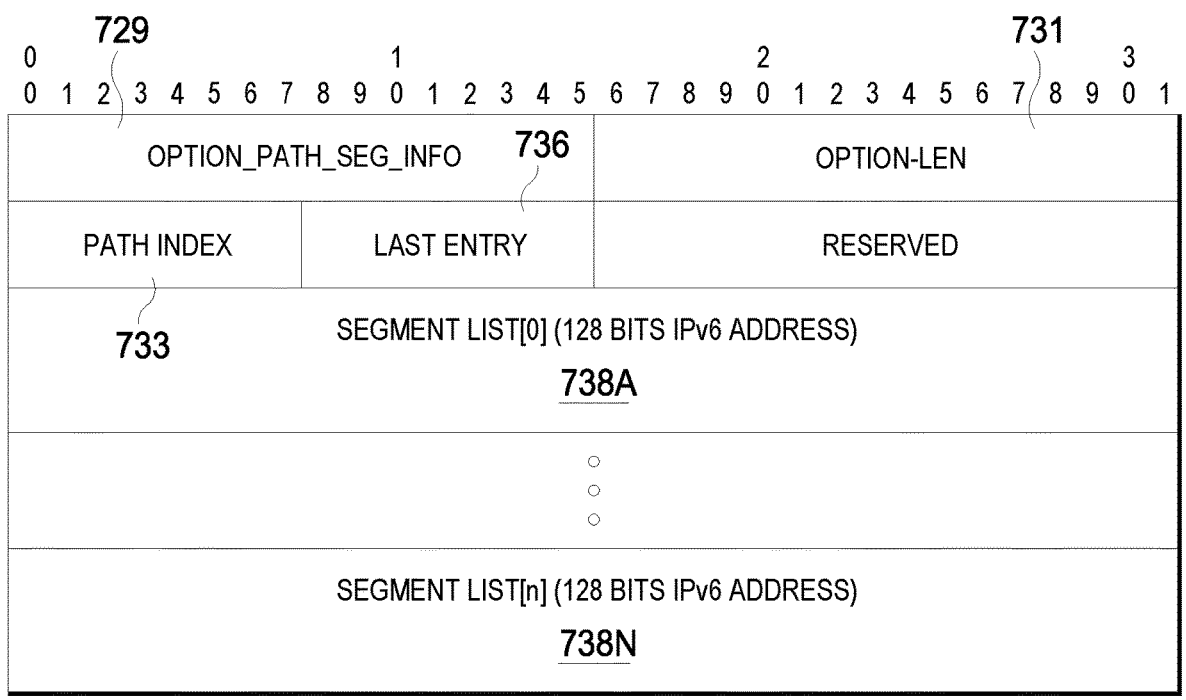

FIG. 7C is a TLV diagram illustrating a format of another DHCP option 600D capable of carrying the path index 243 and the segment list 341 of the path aware network data 240 according to various embodiments of the disclosure. As shown by FIG. 7C, the DHCP option 600D includes an option code field 729, an option length field 731, a path index field 733, a last entry field 736, reserved bits, and one or more segment identifier fields 738A-N.

The option code field 729 includes a value indicating that the DHCP option 600D carries the segment list 341 in the segment identifier fields 738A-N. The value included in the option code field 729 may be assigned by the IANA. The option length field 731 carries a value indicating the length of the DHCP option 600D, not including the option code field 729 and the option length field 731, in units of 8 octets. The path index field 733 carries the path index 243. The last entry field 736 indicates whether the DHCP option 600D is the last entry of the segment list 341. The segment identifier fields 738A-N each carry an address or an identifier or a segment in the segment list 341. For example, the segment identifier 738A carries an IPv6 address of a first segment in the segment list 341, and the segment identifier 738N carries an IPv6 address of a last segment in the segment list 341.

Figure 7D:
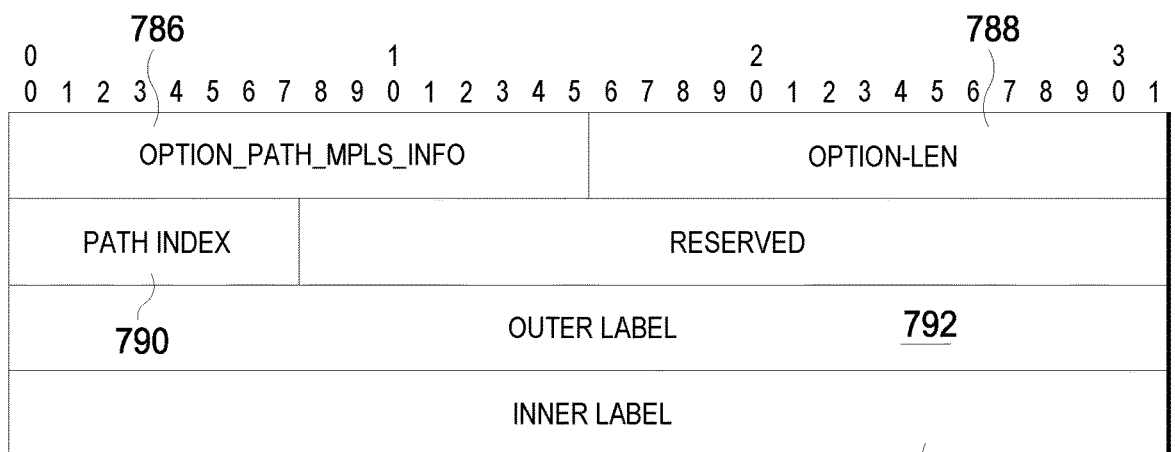

FIG. 7D is a TLV diagram illustrating a format of DHCP option 600E capable of carrying the path index 243 and the MPLS labels 344 of the path aware network data 240 according to various embodiments of the disclosure. As shown by FIG. 7D, the DHCP option 600E includes an option code field 786, an option length field 788, a path index field 790, reserved bits, an outer label field 792, and an inner label field 794.

The option code field 786 includes a value indicating that the DHCP option 600E carries the MPLS labels 344 in the outer label field 792 and the inner label field 794. The value included in the option code field 786 may be assigned by the IANA. The option length field 788 carries a value indicating the length of the DHCP option 600E, not including the option code field 786 and the option length field 788, in units of 8 octets. The path index field 790 carries the path index 243.

The outer label field 792 carrier an outmost MPLS label that is pushed onto a data packet when transmitting the data packet through a path in a network 100 implementing MPLS. The inner label field 794 carries an inner MPLS label, which may normally be for the path index association. The inner MPLS label is also pushed onto a data packet for transmission along a path in the network 100 implementing MPLS.

Figure 8:
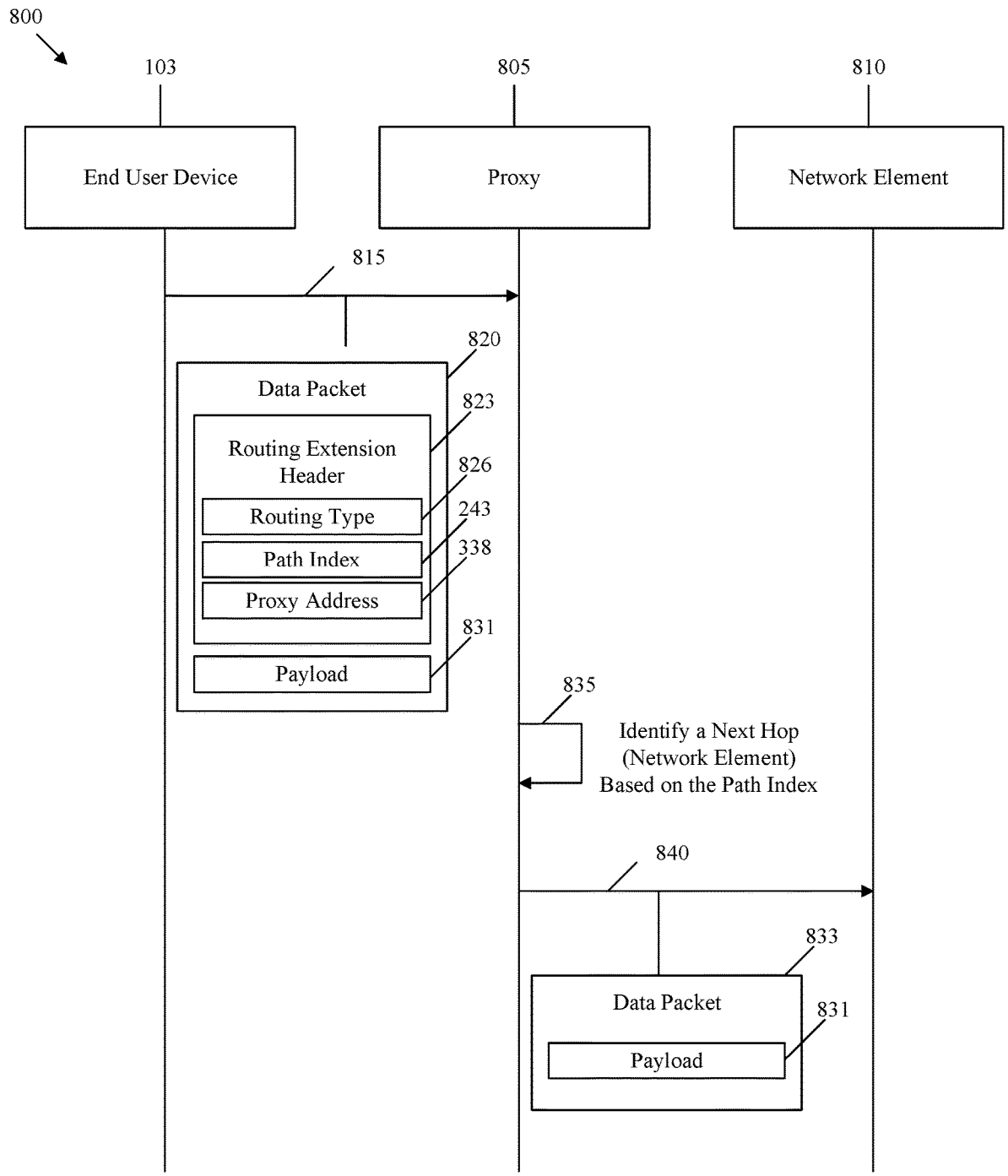
FIG. 8 is a message sequence diagram illustrating communications between an end user device, proxy, and the NE in the data plane according to various embodiments of the disclosure.

FIG. 8 is a message sequence diagram 800 illustrating communications between an end user device 103, proxy 805, and the NE 810 in the data plane according to various embodiments of the disclosure. The end user device 103, proxy 805, and NE 810 include components similar to NE 200. The proxy 805 and NE 810 may be positioned anywhere within network 100 between the end user device 103 and the content provider network 118. In an embodiment, the proxy 805 may be the BNG 130 of FIG. 1A or the PGW 142 of FIG. 1A. In this embodiment, the NE 810 may be a router, switch, bridge, virtual private network (VPN), or other network device positioned in the IP core network 132, the IP core network 145, or the content provider network 118.

In an embodiment, the message sequence diagram 800 is implemented after the end user device 103 receives the path aware network data 240, which indicates that data plane transmissions can be transmitted to the proxy 805 and the NE 810 using a path aware routing protocol. In this embodiment, the transmission protocol 332 indicates a value representing the path aware routing protocol, and the path information 335 included in the data plane information 249 also includes the proxy address 338.

In this embodiment, the end user device 103 generates encapsulates a data packet 820 including a payload 831 to further include a routing extension header 823. In general, the routing extension header 823 is an extension of an IP header on the data packet 820 that carries control information. The control information is used to process the data packet 820 at each hop on the path and/or at a destination (e.g., content provider network 118). The routing extension header 823 is used by the end user device 103 to list one or more intermediate nodes to be visited on the way to the destination of the data packet 820. A general routing extension header 823 may be further defined in Internet Engineering Task Force (IETF) RFC 8200 entitled "Internet Protocol, version 6 (IPv6) specification," dated July 2017 (hereinafter referred to as RFC 8200).

In an embodiment, the routing extension header 823 additionally includes some of the path aware network data 240 received from the NE 305 (FIG. 3). In this embodiment, the routing extension header 823 includes a routing type 826, the path index 243, and the proxy address 338. The routing type 826 may include a value indicating that the data packet 820 is encoded according to the transmission protocol 332 identified as the path aware routing protocol. The value may be assigned by the IANA. The path index 243 and the proxy address 338 are used by the end user device 103, proxy 805, and NE 810 to determine hops along which to forward the data packet 820. The data packet 820 also includes a payload 831, which is user data that is to be sent to the destination.

At step 815, the end user device 103 transmits the data packet 820 including the routing extension header 823 to the proxy 805 identified by the proxy address 338 included in the routing extension header 823. In an embodiment, Tx/Rx 210 transmits the data packet 820 to the proxy 805. The data packet 820 including the routing extension header 823 may be forwarded through multiple NEs, links, interfaces, and subnetworks before reaching the proxy 805.

At step 835, after receiving the data packet 820, the proxy 805 determines how to process and forward the data packet 820 based on the routing extension header 823. In an embodiment, the proxy 805 determines that the proxy 805 has been identified in the routing extension header 823. The proxy 805 also determines a next hop toward which to forward the data packet 820 based on the path index 243. For example, the proxy 805 may use a local forwarding database to search for a forwarding entry that indicates a next hop for the path corresponding to the path index and the destination of the path. In an embodiment, the proxy 805 also determines a transmission protocol 332 by which to forward the data packet 820 based on the routing type 826 included in the routing extension header 823. For example, the path aware configuration module 232 is executed by the processor 230 to perform the above determinations.

After the above determinations have been made, the proxy 805 decapsulates the data packet 820 to remove the routing extension header 823 from the data packet 820 to create data packet 833. At step 840, the proxy 805 transmits the data packet 833 including the payload 831 (without the routing extension header 823) to a NE 810.

Figure 9:
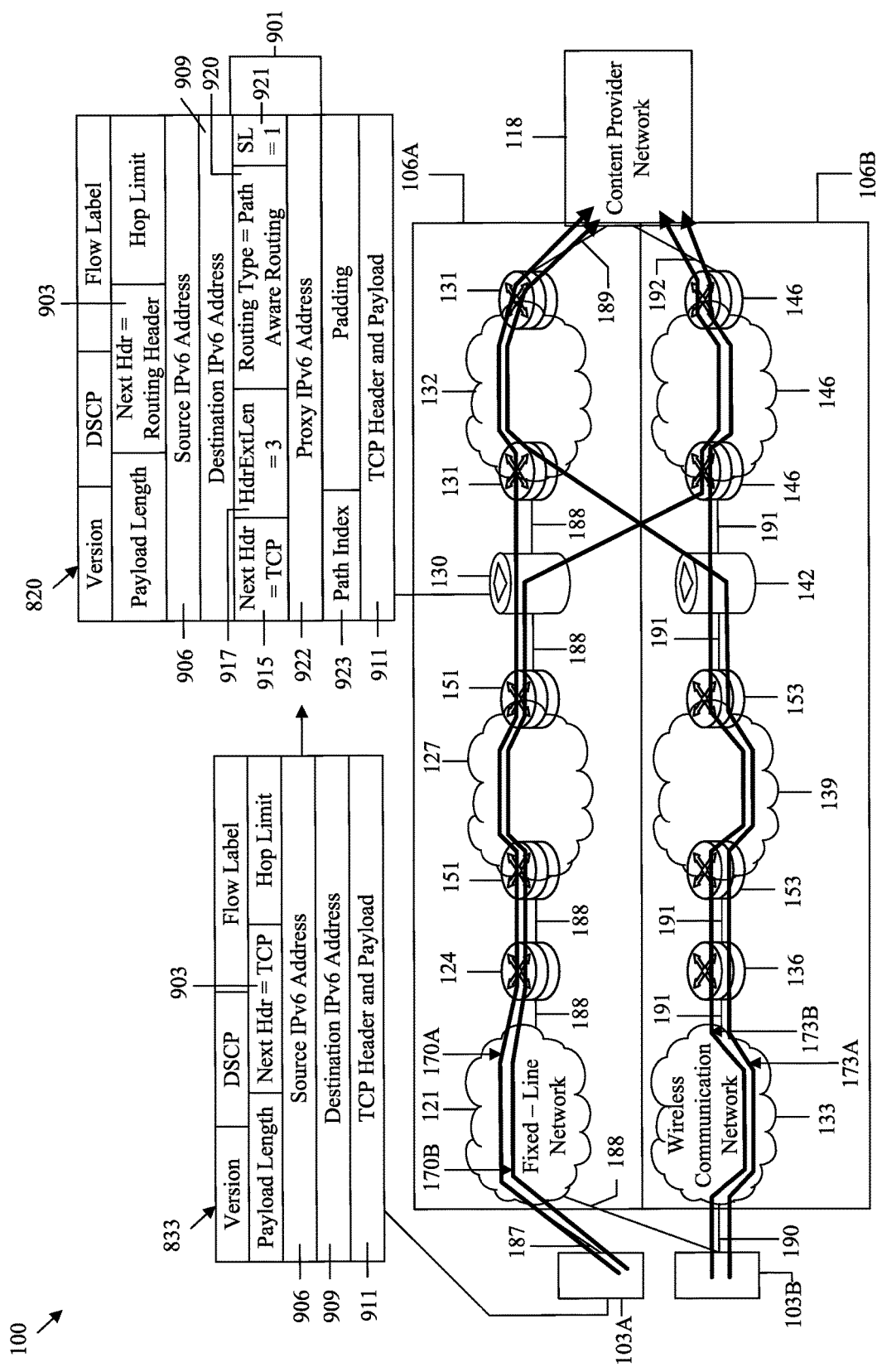
FIG. 9 is a diagram illustrating the transmission of a data packet across a network according to various embodiments of the disclosure.

FIG. 9 is a diagram illustrating the transmission of a data packet 833 and 820 across network 100 according to various embodiments of the disclosure. In an embodiment, the end user device 103A generates the data packet 833, which may include various fields typical of an IP data packet. For example, the data packet 833 includes a version field, a differentiated services code point (DSCP) field, and a hop limit field. As shown by FIG. 9, the data packet 833 also includes a next header field 903, a source IPv6 address field 906, a destination IPv6 address field 909, and a transmission control protocol (TCP) header and payload 911.

The next header field 903 includes a value representing a header or extension header that follows the destination IPv6 address field 909. Since the TCP header follows the destination IPv6 address field 909 in the data packet 833, the next header field 903 includes a value representing the TCP header. The source IPv6 address field 906 includes an IPv6 address of the source of the path (e.g., the end user device 103A). The destination IPv6 address field 909 includes an IPv6 address of the destination of the path (e.g., the content provider network 118). The TCP header and payload 911 includes fields associated with the TCP header and the payload included in the data packet 833.

After generating the data packet 833, the end user device 103A determines a manner by which to encapsulate the data packet 833 based on the data plane information 249 received by an NE in the network 100. In an embodiment, when the data plane information 249 includes a transmission protocol 332 representing the path aware routing protocol and a proxy address 338, the end user device 103A determines that the data packet 833 should be encapsulated to include the routing extension header 901.

As shown by FIG. 9, the routing extension header 901 is added to the data packet 833 to create the data packet 820. The next header field 903 has been modified in the data packet 820 to include a value indicating that the extension header following the destination IPv6 address field 909 is the routing extension header 901.

The routing extension header 901 in FIG. 9 is similar to the routing extension header 823 of FIG. 8 in that the routing extension header 901 includes various fields configured to carry the information described relative to the routing extension header 823 described in FIG. 8. The routing extension header 901 includes a next header field 915, a length field 917, a routing type field 920, a segments left field 921, a proxy IPv6 address field 922, a path index field 923, and bit padding.

The next header field 915 includes the value indicating that the next header or extension header following the routing extension header 901 is the TCP header. The length field 917 carries a length of the routing extension header 901, including the next header field 915 and the length field 917. The routing type field 920 includes the routing type 826, which is a value identifying that the data packet 820 is encoded and encapsulated according to the path aware routing protocol. The segments left field 921 includes a value of 1 or some other value. The proxy IPv6 address field 922 carries the proxy address 338. The path index field 923 carries the path index 243 identifying the path to the destination.

As described above with reference to FIG. 8, the end user device 103A transmits the data packet 820 to a proxy, which in network 100, may be the BNG 130. The BNG 130 is configured to decapsulate the data packet 820 and remove the routing extension header 901 to again generate the data packet 833. The BNG 130 determines a next hop by which to forward the data packet 833 based on the path index 243. For example, the BNG 130 performs a lookup at the local forwarding database using the destination IPv6 address 909 and the path index 243 to identify the next hop on the path. Subsequently, the BNG 130 forwards the data packet 833 through the IP core network 132 or the IP core network 145.

Figure 10:
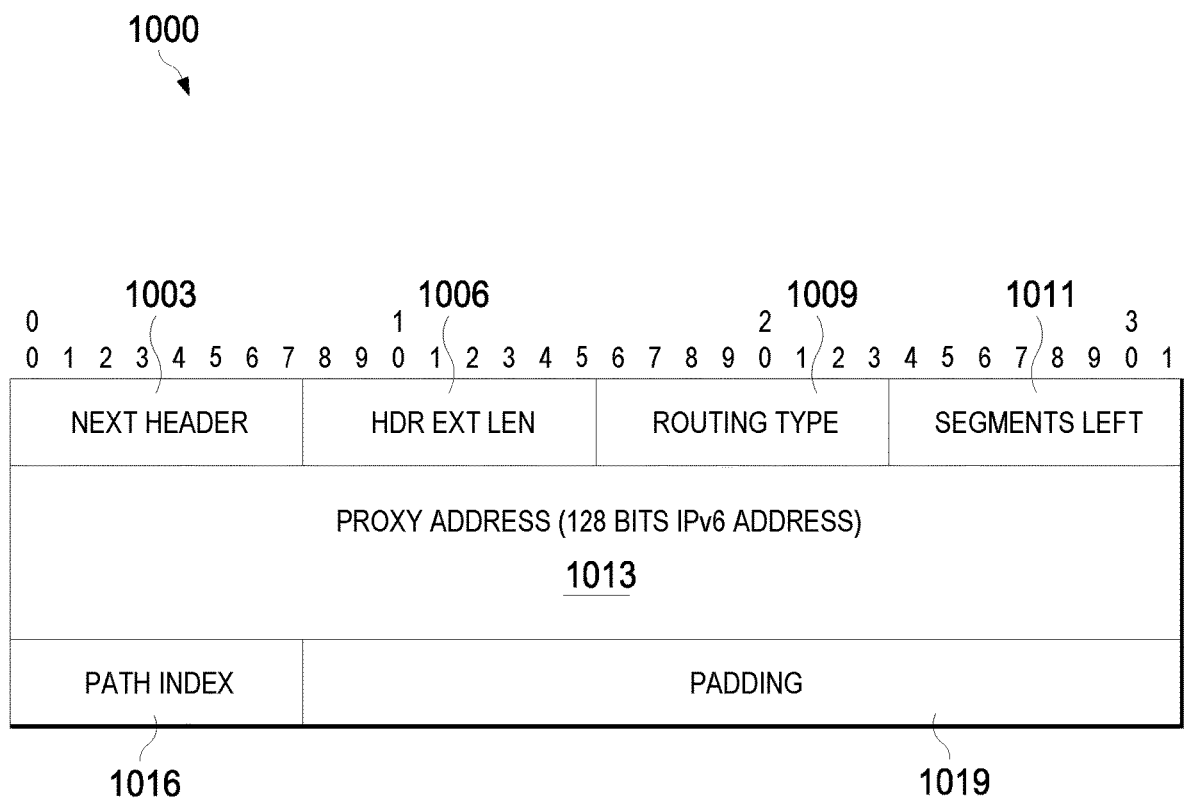
FIG. 10 is a TLV diagram illustrating a format of the routing extension header in a data packet according to various embodiments of the disclosure.

FIG. 10 is a TLV diagram illustrating a format of the routing extension header 1000 in a data packet 820 according to various embodiments of the disclosure. The routing extension header 1000 is similar to the routing extension header 901. The routing extension header 1000 includes a next header field 1003, a length field 1006, a routing type field 1009, a segments left field 1011, a proxy address field 1013, a path index field 1016, and bit padding 1019.

The next header field 1003 is similar to the next header field 915 of FIG. 9. The length field 1006 is similar to the length field 917 of FIG. 9. The routing type field 1009 is similar to the routing type field 909 of FIG. 9. The segments left field 1011 is similar to the segments left field 921 of FIG. 9. The proxy address field 1013 is similar to the proxy IPv6 address field 922 of FIG. 9. The path index field 1016 is similar to the path index field 923 of FIG. 9.

Figure 11:
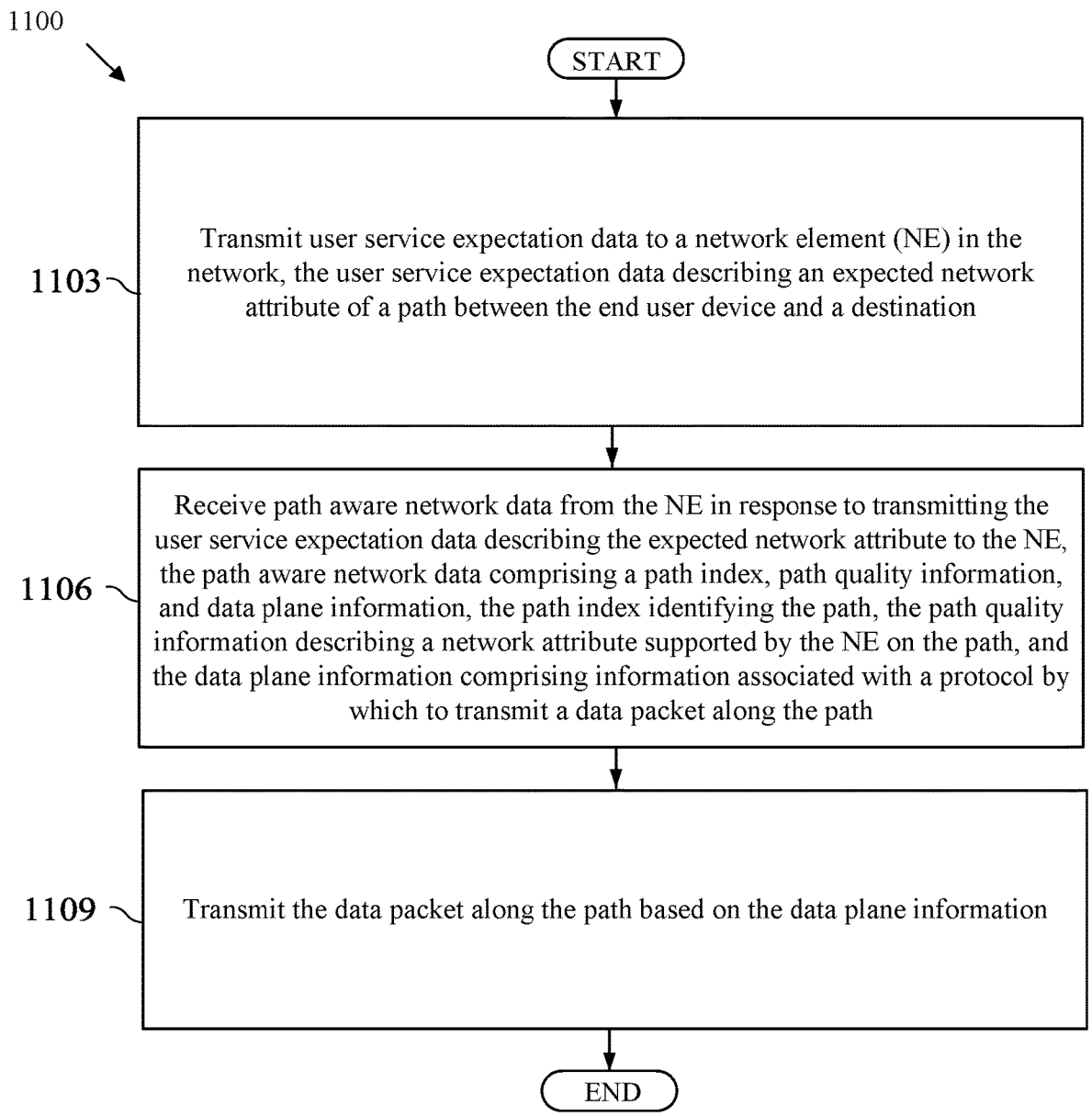
FIG. 11 is a flowchart illustrating a method of implementing path aware networking according to various embodiments of the disclosure.

FIG. 11 is a flowchart illustrating a method 1100 of implementing path aware networking according to various embodiments of the disclosure. Method 1100 may be implemented by an end user device 103. Method 1100 may be implemented when the end user device 103 generates the user service expectation data 235 with the expected network attribute 238.

At step 1103, the user service expectation data 235 is sent to an NE 305 in the network 100. In an embodiment, the Tx/Rx 210 transmits the user service expectation data 235 to an NE 305 in the network 100. In an embodiment, the user service expectation data 235 describes an expected network attribute 238 of a path between the end user device 103 and a destination (e.g., the content provider network 118).

At step 1106, the path aware network data 240 is received from the NE 305 in response to transmitting the user service expectation data 235 to the NE 305. In an embodiment, the Tx/Rx 210 receives the path aware network data 240 from the NE 305. In an embodiment, the path aware network data 240 includes a path index 243, path quality information 246, and data plane information 249. In an embodiment, the path index 243 identifies a path. In an embodiment, the path quality information 246 describes a network attribute supported by the NE 305 on the path. In an embodiment, the data plane information 249 includes information associated with a protocol by which to transmit a data packet 820 along the path.

At step 1109, the data packet 820 or 833 is transmitted along the path based on the data plane information 249. In an embodiment, the Tx/Rx 210 transmits the data packet 820 or 833.

Figure 12:
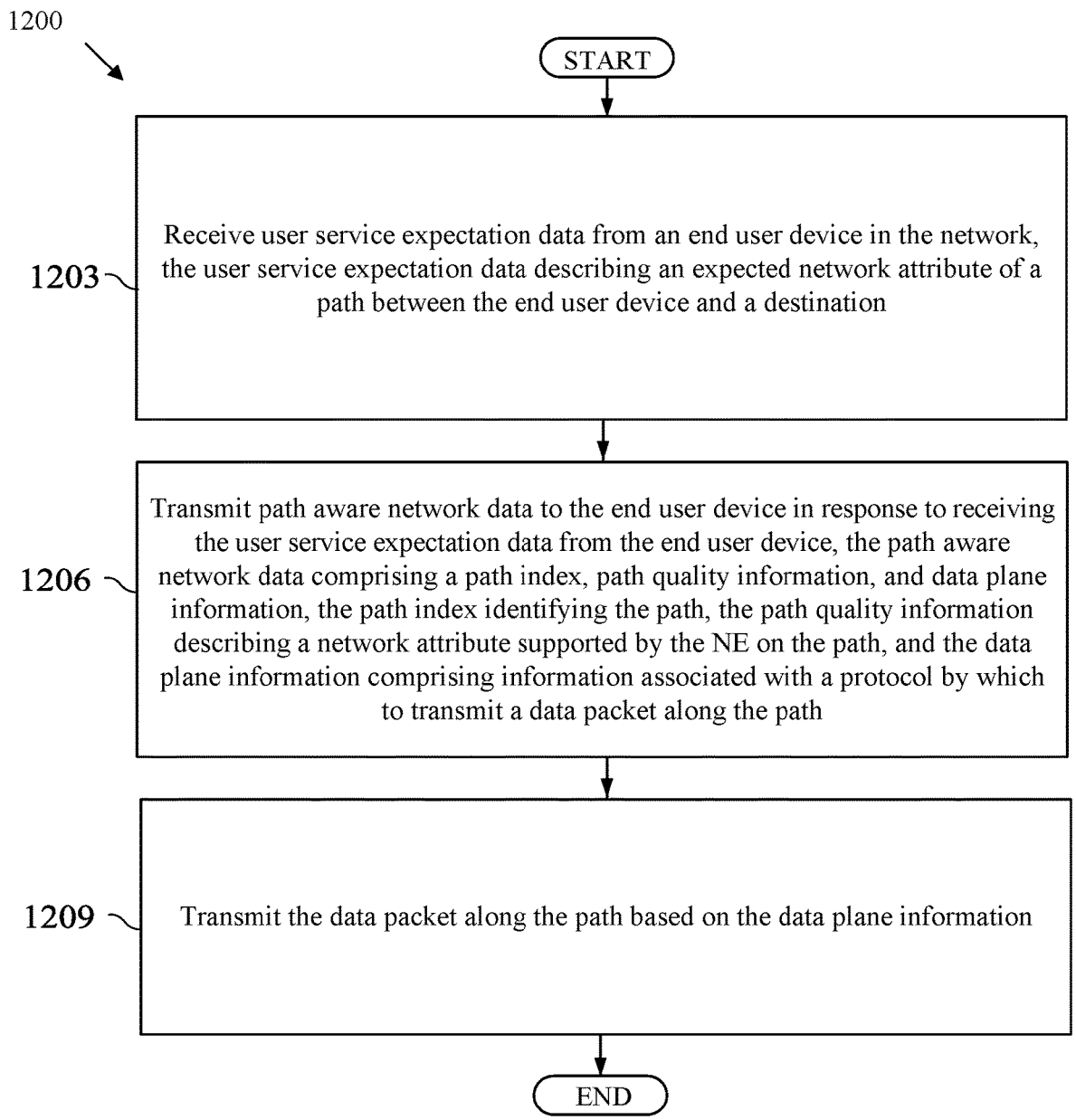
FIG. 12 is a flowchart illustrating another method of implementing path aware networking according to various embodiments of the disclosure.

FIG. 12 is a flowchart illustrating another method 1200 of implementing path aware networking according to various embodiments of the disclosure. Method 1200 may be implemented by an NE 305 or 810. Method 1200 may be implemented after the NE 305 or 810 receives the path aware network data 240 from an operator of the network 100.

At step 1203, the user service expectation data 235 is received from an end user device 103 in the network 100. In an embodiment, the Tx/Rx 210 receives the user service expectation data 235 from the end user device 103 in the network 100. In an embodiment, the user service expectation data 235 describes an expected network attribute 238 of a path between the end user device 103 and a destination (e.g., the content provider network 118).

At step 1206, the path aware network data 240 is transmitted to the end user device 103 in response to receiving the user service expectation data 235 from the end user device 103. In an embodiment, the Tx/Rx 210 transmits the path aware network data 240 to the end user device 103. In an embodiment, the path aware network data 240 includes a path index 243, path quality information 246, and data plane information 249. In an embodiment, the path index 243 identifies a path. In an embodiment, the path quality information 246 describes a network attribute supported by the NE 305 on the path. In an embodiment, the data plane information 249 includes information associated with a protocol by which to transmit a data packet 820 along the path.

At step 1209, the data packet 820 or 833 is transmitted along the path based on the data plane information 249. In an embodiment, the Tx/Rx 210 transmits the data packet 820 or 833.

Figure 13:
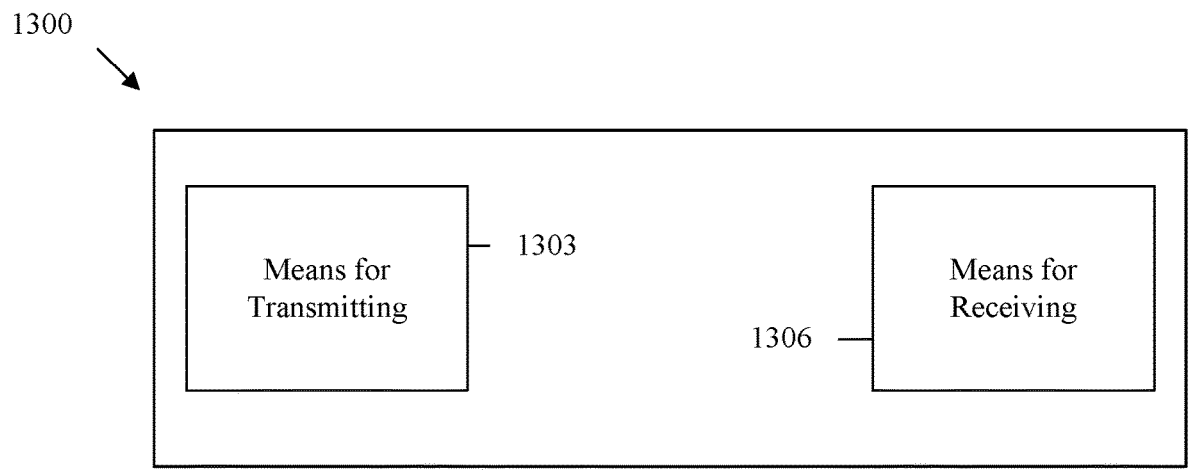
FIG. 13 is a diagram illustrating an apparatus for implementing path aware networking according to various embodiments of the disclosure.

FIG. 13 is a diagram illustrating an apparatus 1300 for implementing path aware networking according to various embodiments of the disclosure. The apparatus 1300 comprises a means for transmitting 1303 and a means for receiving 1306.

In an embodiment, the means for transmitting 1303 includes transmitting the user service expectation data 235 to an NE 305 in the network 100. In an embodiment, the user service expectation data 235 describes an expected network attribute 238 of a path between the end user device 103 and a destination (e.g., the content provider network 118).

In this embodiment, the means for receiving 1306 includes receiving the path aware network data 240 from the NE 305 in response to transmitting the user service expectation data 235 to the NE 305. In an embodiment, the path aware network data 240 includes a path index 243, path quality information 246, and data plane information 249. In an embodiment, the path index 243 identifies a path. In an embodiment, the path quality information 246 describes a network attribute supported by the NE 305 on the path. In an embodiment, the data plane information 249 includes information associated with a protocol by which to transmit a data packet 820 along the path. In this embodiment, the means for transmitting 1303 also includes transmitting the data packet 820 or 833 along the path based on the data plane information 249.

In another embodiment, the means for receiving 1306 includes receiving the user service expectation data 235 from end user device 103. In an embodiment, the user service expectation data 235 describes an expected network attribute 238 of a path between the end user device 103 and a destination (e.g., the content provider network 118).

In this embodiment, the means for transmitting 1303 includes transmitting the path aware network data 240 to the NE 305 in response to receiving the user service expectation data 235 from the end user device 103. In an embodiment, the path aware network data 240 includes a path index 243, path quality information 246, and data plane information 249. In an embodiment, the path index 243 identifies a path. In an embodiment, the path quality information 246 describes a network attribute supported by the NE 305 on the path. In an embodiment, the data plane information 249 includes information associated with a protocol by which to transmit a data packet 820 along the path. In this embodiment, the means for transmitting 1303 also includes transmitting the data packet 820 or 833 along the path based on the data plane information 249.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by an end user device in a network, comprising:
   transmitting, by the end user device, user service expectation data to a network element (NE) in the network, the user service expectation data describing an expected network attribute of a path including the NE between the end user device and a destination;
   receiving, by the end user device, path aware network data from the NE in response to transmitting the user service expectation data describing the expected network attribute to the NE, the path aware network data comprising a path index, path quality information, and data plane information, the path index identifying the path, the path quality information describing a network attribute supported by the NE on the path, and the data plane information comprising information associated with a protocol by which to transmit a data packet along the path; and
   transmitting, by the end user device, the data packet to the NE on the path based on the data plane information.

2. The method of claim 1, wherein the expected network attribute comprises at least one of a minimum bandwidth available on the path, a maximum bandwidth permitted to be forwarded along the path, a maximum latency for user data on the path, or a burst size permitted to be forwarded along the path.

3. The method of claim 1, wherein the user service expectation data indicates whether the end user device requests a higher bandwidth, a shorter latency for the path, a cost preference associated with different bandwidths and latencies, or a reliability of the path.

4. The method of claim 1, wherein the path quality information comprises at least one of a minimum bandwidth permitted to be forwarded along the NE, a maximum bandwidth permitted to be forwarded along the NE, a maximum latency for user data along the path, a maximum burst size permitted to be forwarded along the NE, or a cost associated with one or more paths.

5. The method of claim 1, wherein the protocol by which to transmit the data packet is a path aware routing protocol, wherein the data plane information comprises a proxy address associated with a proxy on the path.

6. The method of claim 1, wherein the protocol by which to transmit the data packet is Segment Routing over Internet Protocol version 6 data plane (SRv6), wherein the data plane information comprises a segment list, and wherein the segment list comprises an address for each segment on the path.

7. The method of claim 1, wherein the protocol by which to transmit the data packet is Multiprotocol Label Switching (MPLS), wherein the data plane information comprises an outmost MPLS label and an inner MPLS label of an MPLS label stack.

8. The method of claim 1, wherein the protocol by which to transmit the data packet is a path aware routing protocol, wherein the data plane information comprises a proxy address of a proxy on the path, wherein transmitting the data packet based on the data plane information comprises encapsulating the data packet to include a routing extension header, wherein the routing extension header includes a new routing type indicating the path aware routing, the proxy address, and the path index.

9. A method implemented by a network element (NE) in a network, comprising:
receiving, by the NE, user service expectation data from an end user device in the network, the user service expectation data describing an expected network attribute of a path including the NE between the end user device and a destination;
transmitting, by the NE, path aware network data to the end user device in response to receiving the user service expectation data from the end user device, the path aware network data comprising a path index, path quality information, and data plane information, the path index identifying the path, the path quality information describing a network attribute supported by the NE on the path, and the data plane information comprising information associated with a protocol by which to transmit a data packet along the path; and
transmitting, by the NE, the data packet along the path based on the data plane information.

10. The method of claim 9, wherein the expected network attribute comprises at least one of a minimum bandwidth available on the path, a maximum bandwidth permitted to be forwarded along the path, a maximum latency for user data on the path, or a burst size permitted to be forwarded along the path.

11. The method of claim 9, wherein the user service expectation data indicates whether the end user device requests a higher bandwidth, a shorter latency, a cost preference associated with different bandwidths and latencies, or a reliability of the path.

12. The method of claim 9, wherein the user service expectation data is carried in a new options field of a router solicitation message of Internet Protocol (IPv6) Neighbor Discovery Protocol, a new options field of a Dynamic Host Configuration Protocol version 6 (DHCPv6) SOLICIT message, or an options field of a DHCPv6 REQUEST message.

13. The method of claim 9, wherein the path quality information comprises at least one of a minimum bandwidth permitted to be forwarded along the NE, a maximum bandwidth permitted to be transmitted along the NE, a maximum latency for user data along the path, a maximum burst size permitted to be forwarded along the NE, or a cost associated with one or more paths.

14. The method of claim 9, wherein the protocol by which to transmit the data packet along the path is a path aware routing protocol, wherein the data plane information comprises a proxy address associated with a proxy on the path.

15. An end user device, comprising:
a memory configured to store instructions;
a processor coupled to the memory and configured to execute the instructions to cause the processor to be configured to:
transmit user service expectation data to a network element (NE) in a network, the user service expectation data describing an expected network attribute of a path including the NE between the end user device and a destination;
receive path aware network data from the NE in response to transmitting the user service expectation data to the NE, the path aware network data comprising a path index, path quality information, and data plane information, the path index identifying the path, the path quality information describing a network attribute supported by the NE on the path, and the data plane information comprising information associated with a protocol by which to transmit a data packet along the path; and
transmit the data packet to the NE on the path based on the data plane information.

16. The end user device of claim 15, wherein the expected network attribute comprises at least one of a minimum bandwidth available on the path, a maximum bandwidth permitted to be forwarded along the path, a maximum latency for user data on the path, or a burst size permitted to be forwarded along the path.

17. The end user device of claim 15, wherein the user service expectation data indicates whether the end user device requests a higher bandwidth, a shorter latency for the path, a cost preference associated with different bandwidths and latencies, or a reliability of the path.

18. The end user device of claim 15, wherein the path quality information comprises at least one of a minimum bandwidth permitted to be forwarded along the NE, a maximum bandwidth permitted to be forwarded along the NE, a maximum latency for user data along the path, a maximum burst size permitted to be forwarded along the NE, or a cost associated with one or more paths.

19. The end user device of claim 15, wherein the protocol by which to transmit the data packet is a path aware routing protocol, wherein the data plane information comprises a proxy address associated with a proxy along the path.

20. The end user device of claim 15, wherein the protocol by which to transmit the data packet is Segment Routing over Internet Protocol version 6 data plane (SRv6), wherein the data plane information comprises a segment list, and wherein the segment list comprises an address for each segment on the path.

21. The end user device of claim 15, wherein the protocol by which to transmit the data packet is Multiprotocol Label Switching (MPLS), wherein the data plane information comprises an outmost MPLS label and an inner MPLS label of an MPLS label stack.

22. The end user device of claim 15, wherein a protocol by which to transmit the data packet is a path aware routing protocol, wherein the data plane information comprises a proxy address of a proxy on the path, wherein the instructions further cause the processor to be configured to encapsulate the data packet to include a routing extension header, wherein the routing extension header includes a new routing type indicating the path aware routing, the proxy address, and the path index.

23. A network element (NE), comprising:
a memory configured to store instructions;
a processor coupled to the memory and configured to execute the instructions to cause the processor to be configured to:
receive user service expectation data from an end user device in a network, the user service expectation data describing an expected network attribute of a path including the NE between the end user device and a destination;
transmit path aware network data to the end user device in response to the user service expectation data being received from the end user device, the path aware network data comprising a path index, path quality information, and data plane information, the path index identifying the path, the path quality information describing a network attribute supported by the NE on the path, and the data plane information comprising information associated with a protocol by which to transmit a data packet along the path; and transmit the data packet along the path based on the data plane information.

24. The NE of claim 23, wherein the expected network attribute comprises at least one of a minimum bandwidth available on the path, a maximum bandwidth permitted to be forwarded along the path, a maximum latency for user data on the path, or a burst size permitted to be forwarded along the path.

25. The NE of claim 23, wherein the user service expectation data indicates whether the end user device requests a higher bandwidth, a shorter latency, a cost preference associated with different bandwidths and latencies, or a reliability of the path.

26. The NE of claim 23, wherein the user service expectation data is carried in a new options field of a router solicitation message of Internet Protocol (IPv6) Neighbor Discovery Protocol, a new options field of a Dynamic Host Configuration Protocol version 6 (DHCPv6) SOLICIT message, or an options field of a DHCPv6 REQUEST message.

27. The NE of claim 23, wherein the path quality information comprises at least one of a minimum bandwidth permitted to be forwarded along the NE, a maximum bandwidth permitted to be transmitted along the NE, a maximum latency for user data along the path, a maximum burst size permitted to be forwarded along the NE, or a cost associated with one or more paths.

28. The NE of claim 23, wherein the protocol by which to transmit the data packet along the path is a path aware routing protocol, wherein the data plane information comprises a proxy address associated with a proxy on the path.

* * * * *